US010757739B2

(12) United States Patent
Cho et al.

(10) Patent No.: US 10,757,739 B2
(45) Date of Patent: Aug. 25, 2020

(54) METHOD FOR TRANSMITTING AND RECEIVING DATA IN WIRELESS COMMUNICATION SYSTEM AND APPARATUS FOR SUPPORTING SAME

(71) Applicant: LG ELECTRONICS INC., Seoul (KR)

(72) Inventors: Heejeong Cho, Seoul (KR); Jiwon Kang, Seoul (KR); Heejin Kim, Seoul (KR); Ilmu Byun, Seoul (KR); Hyunjin Shim, Seoul (KR); Genebeck Hahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/084,208

(22) PCT Filed: Feb. 13, 2017

(86) PCT No.: PCT/KR2017/001545
§ 371 (c)(1),
(2) Date: Sep. 11, 2018

(87) PCT Pub. No.: WO2017/155216
PCT Pub. Date: Sep. 14, 2017

(65) Prior Publication Data
US 2019/0075601 A1 Mar. 7, 2019

Related U.S. Application Data

(60) Provisional application No. 62/306,608, filed on Mar. 10, 2016.

(51) Int. Cl.
*H04W 74/08* (2009.01)
*H04W 72/04* (2009.01)
(Continued)

(52) U.S. Cl.
CPC ... *H04W 74/0833* (2013.01); *H04W 72/0446* (2013.01); *H04W 74/085* (2013.01); *H04W 88/02* (2013.01); *H04W 88/08* (2013.01)

(58) Field of Classification Search
None
See application file for complete search history.

(56) References Cited

U.S. PATENT DOCUMENTS

2009/0257421 A1* 10/2009 Nakashima ......... H04L 27/2608
370/345
2010/0296467 A1* 11/2010 Pelletier ............. H04W 74/002
370/329
(Continued)

FOREIGN PATENT DOCUMENTS

KR 20000029041 5/2000
KR 20060009289 1/2006
(Continued)

OTHER PUBLICATIONS

PCT International Application No. PCT/KR2017/001545, International Search Report dated May 22, 2017, 7 pages.

*Primary Examiner* — Brian S Roberts
(74) *Attorney, Agent, or Firm* — Lee, Hong, Degerman, Kang & Waimey PC

(57) ABSTRACT

The present invention relates to a method and an apparatus for transmitting and receiving, by a terminal, data in a wireless communication system. The present invention may provide a method and an apparatus which receive, from a base station, a system information block comprising backoff information for an arbitrary connection procedure; select an arbitrary backoff time between a first minimum backoff time and a first maximum backoff time; transmit, to the base station, a preamble for any connection after the selected arbitrary backoff time has elapsed; receive a response message comprising resource information for transmitting data, (Continued)

in response to the preamble; and transmit, to the base station, the data on the basis of the resource information.

12 Claims, 23 Drawing Sheets

(51) Int. Cl.
 *H04W 88/02* (2009.01)
 *H04W 88/08* (2009.01)

(56) References Cited

U.S. PATENT DOCUMENTS

| | | | | |
|---|---|---|---|---|
| 2013/0279453 | A1* | 10/2013 | Han | H04W 74/0841 |
| | | | | 370/329 |
| 2014/0098667 | A1* | 4/2014 | Choi | H04W 74/085 |
| | | | | 370/230 |
| 2015/0195855 | A1* | 7/2015 | Liu | H04W 74/08 |
| | | | | 370/336 |

FOREIGN PATENT DOCUMENTS

| | | |
|---|---|---|
| KR | 20080032258 | 4/2008 |
| KR | 20120032648 | 4/2012 |
| KR | 20130058741 | 6/2013 |

\* cited by examiner

Fig. 3
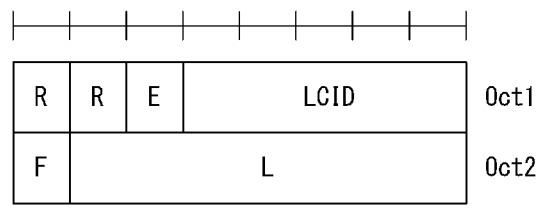 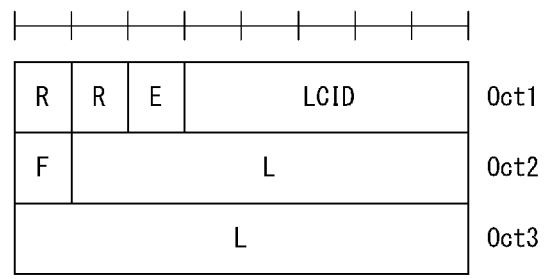
(a) R/R/E/LCID/F/L sub-header with 7-bit L field
(b) R/R/E/LCID/F/L sub-header with 15-bit L field R/R/E/LCID sub-header Fig. 6
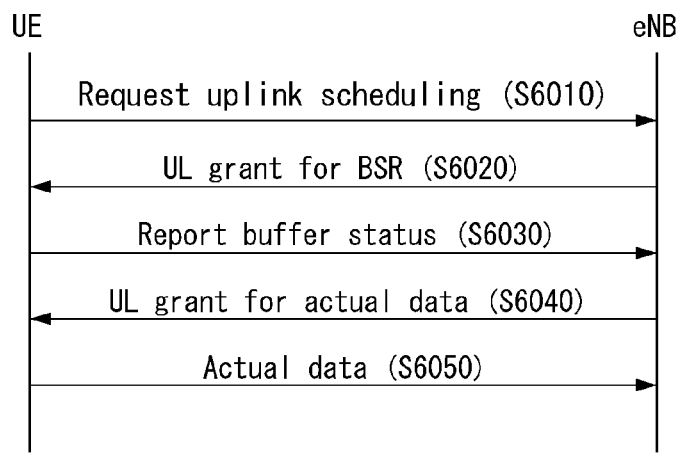
(a)
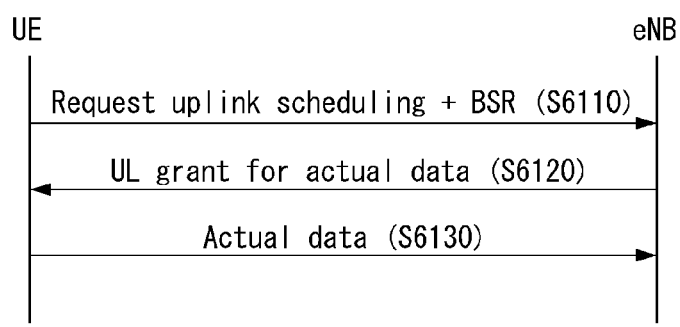
(b)

Fig. 12
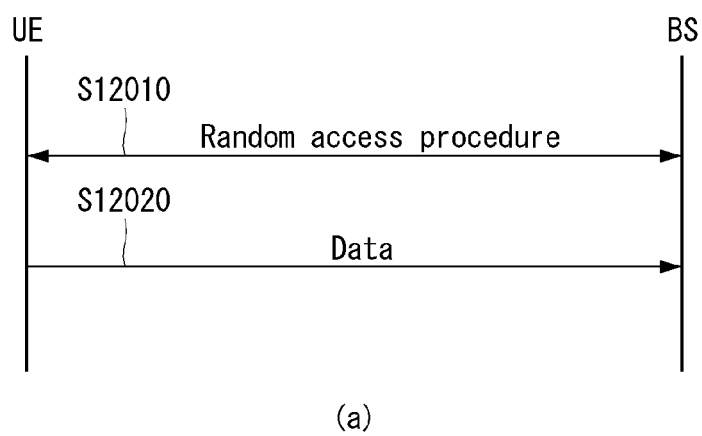
(a)
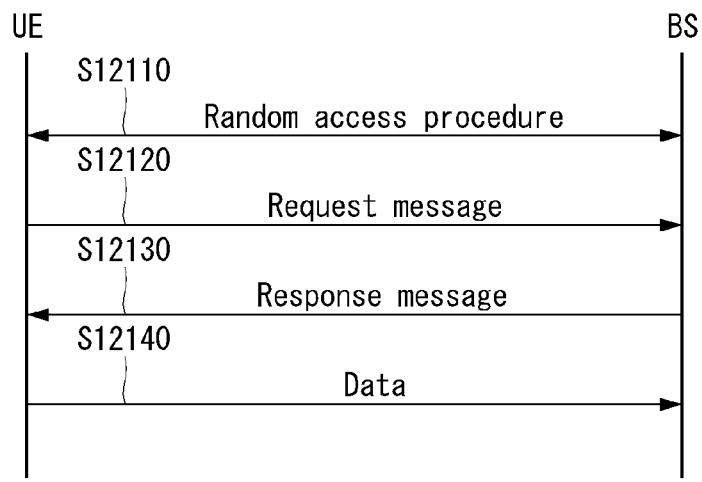
(b)

Fig. 13
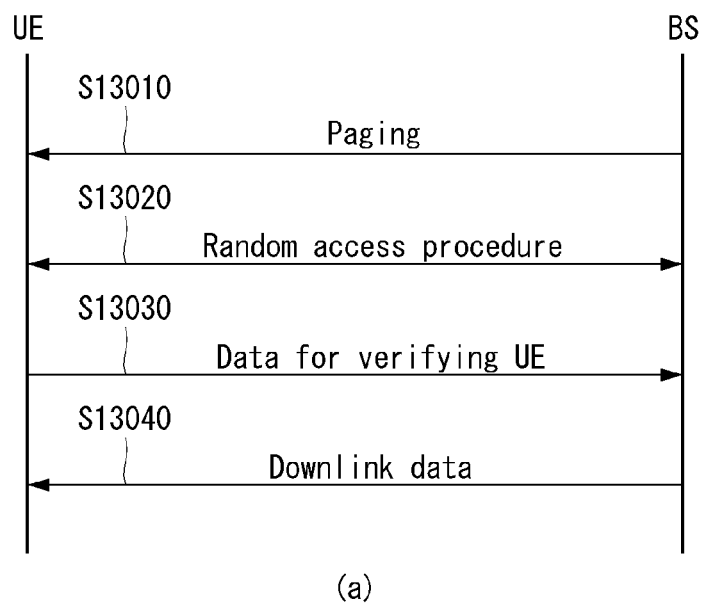
(a)
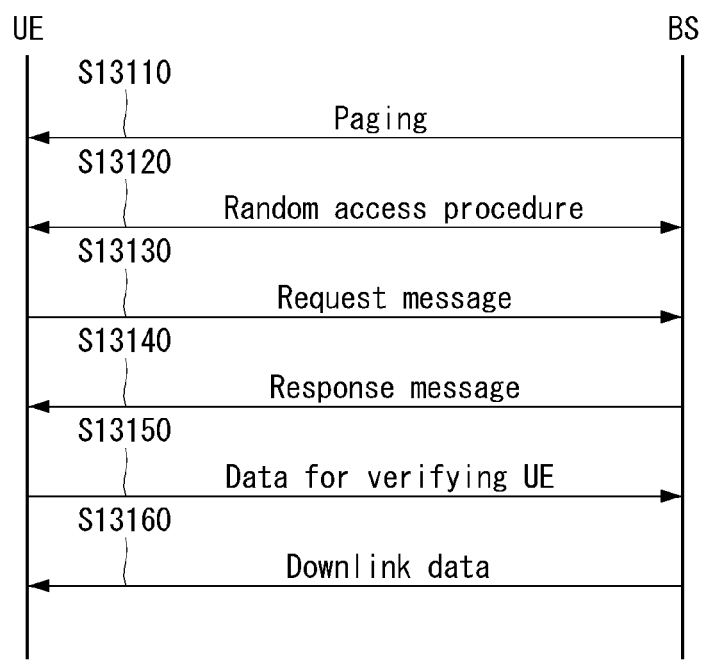
(b)

| Number of random accesses | Backoff parameter value | | Change X of backoff value depending on data transmission direction | | Change O of backoff parameter value depending on data transmission direction | | | |
|---|---|---|---|---|---|---|---|---|
| | Minimum backoff time | Maximum backoff time | Minimum backoff time | Maximum backoff time | Minimum backoff time (downlink) | Maximum backoff time (downlink) | Minimum backoff time (uplink) | Maximum backoff time (uplink) |
| 1 | 0 | 0 | 0 | 0 | 0 | 0 | $0+\alpha$ | $0+\beta$ |
| 2 | 0 | 10 | 0 | 10 | 0 | 10 | $0+\alpha$ | $10+\beta$ |

(b)

| Number of random accesses | Backoff parameter value | | Change X of backoff value depending on data transmission direction | | Change O of backoff parameter value depending on data transmission direction | | | |
|---|---|---|---|---|---|---|---|---|
| | Minimum backoff time | Maximum backoff time | Minimum backoff time | Maximum backoff time | Minimum backoff time (downlink) | Maximum backoff time (downlink) | Minimum backoff time (uplink) | Maximum backoff time (uplink) |
| 1 | 0 | 0 | 0 | 0 | 0 | 0 | 0 | 0 |
| 2 | 0 | 10 | 0 | 10 | 0 | 10 | 0 | $10*\beta$ |

Fig. 17

| Number of random accesses | Backoff parameter value | | Change X of backoff value depending on data transmission direction | | Change O of backoff parameter value depending on data transmission direction | | | |
|---|---|---|---|---|---|---|---|---|
| | Minimum backoff time | Maximum backoff time | Minimum backoff time | Maximum backoff time | Minimum backoff time (downlink) | Maximum backoff time (downlink) | Minimum backoff time (uplink) | Maximum backoff time (uplink) |
| 1 | 0 | 10 | 0 | 10 | 0 | $10-\alpha$ | 0 | $10+\beta$ |
| 2 | 0 | 20 | 0 | 20 | 0 | $20-\alpha$ | 0 | $20+\beta$ |

| Number of random accesses | Backoff parameter value | | Change X of backoff value depending on data transmission direction | | Change O of backoff parameter value depending on data transmission direction | | | |
|---|---|---|---|---|---|---|---|---|
| | Minimum backoff time | Maximum backoff time | Minimum backoff time | Maximum backoff time | Minimum backoff time (downlink) | Maximum backoff time (downlink) | Minimum backoff time (uplink) | Maximum backoff time (uplink) |
| 1 | 0 | 0 | 0 | 0 | 0 | 0 | 0 | 0 |
| 2 | 0 | 10 | 0 | 10 | 0 | $10-\alpha$ | 0 | $10-\beta$ |

(b)

| Number of random accesses | Backoff parameter value | | Change X of backoff value depending on data transmission direction | | Change O of backoff parameter value depending on data transmission direction | | | |
|---|---|---|---|---|---|---|---|---|
| | Minimum backoff time | Maximum backoff time | Minimum backoff time | Maximum backoff time | Minimum backoff time (downlink) | Maximum backoff time (downlink) | Minimum backoff time (uplink) | Maximum backoff time (uplink) |
| 1 | 0 | 0 | 0 | 0 | 0 | $10/\alpha$ | 0 | $20/\beta$ |
| 2 | 0 | 10 | 0 | 10 | 0 | $20/\alpha$ | 0 | $20/\beta$ |

(c)

| Number of random accesses | Backoff parameter value | | Change X of backoff value depending on data transmission direction | | Change O of backoff parameter value depending on data transmission direction | | | |
|---|---|---|---|---|---|---|---|---|
| | Minimum backoff time | Maximum backoff time | Minimum backoff time | Maximum backoff time | Minimum backoff time (downlink) | Maximum backoff time (downlink) | Minimum backoff time (uplink) | Maximum backoff time (uplink) |
| 1 | 0 | 0 | 0 | 0 | 0 | 0 | 0 | 0 |
| 2 | 0 | 10 | 0 | 10 | 0 | $10/\alpha$ | 0 | $10/\beta$ |

Fig. 22
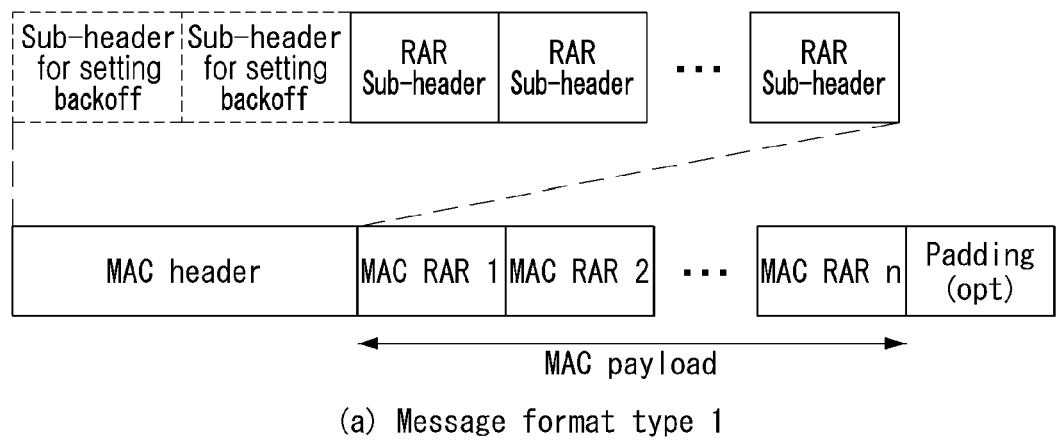
(a) Message format type 1
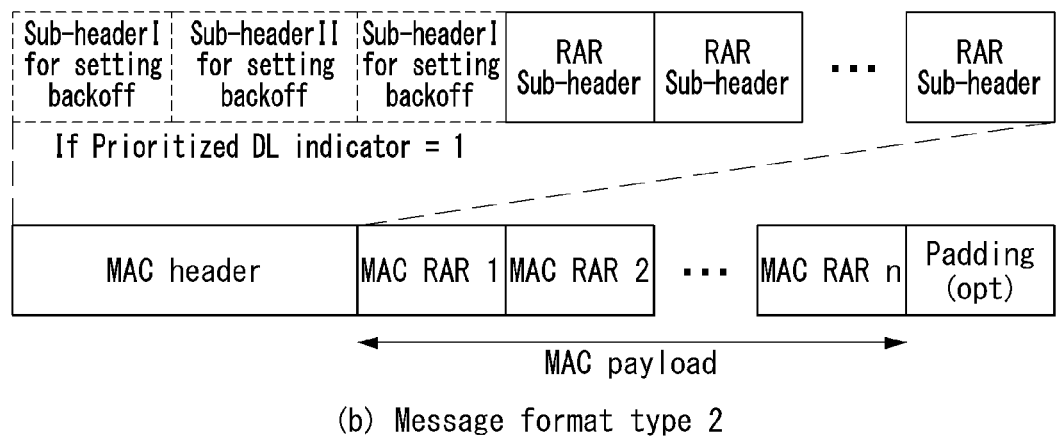
(b) Message format type 2

METHOD FOR TRANSMITTING AND RECEIVING DATA IN WIRELESS COMMUNICATION SYSTEM AND APPARATUS FOR SUPPORTING SAME

CROSS-REFERENCE TO RELATED APPLICATIONS

This application is the National Stage filing under 35 U.S.C. 371 of International Application No. PCT/KR2017/001545, filed on Feb. 13, 2017, which claims the benefit of U.S. Provisional Application No. 62/306,608, filed on Mar. 10, 2016, the contents of which are all hereby incorporated by reference herein in their entireties.

TECHNICAL FIELD

The present invention relates to a method for transmitting and receiving, by a terminal, data in a wireless communication system, and more particularly, to a method for transmitting and receiving data by differently setting a backoff time for each terminal without generating a connection between a terminal and a network node.

BACKGROUND ART

Mobile communication systems have emerged to provide a voice service while guaranteeing mobility of a user. The mobile communication system of today has been expanded to support data services in addition to the voice service. Due to the explosive increase of today's traffic, resources are running short; more and more users are demanding higher speed services; and a more advanced mobile communication system is required accordingly.

Key requirements for a next-generation mobile communication system include accommodation of explosive data traffic, significant increase of transmission rate per user, accommodation of a significantly increased number of connected devices, very low end-to-end latency, and high energy efficiency. In order to meet the requirements, various technologies such as dual connectivity, massive Multiple Input Multiple Output (MIMO), in-band full duplex, Non-Orthogonal Multiple Access (NOMA), super wideband, and device networking are being studied.

DISCLOSURE

Technical Problem

An embodiment of the present invention provides a resource scheduling method for transmitting and receiving data and an apparatus thereof.

Furthermore, an embodiment of the present invention provides a method and an apparatus for differentially setting a backoff time according to an arbitrary connection purpose of a terminal by a network node.

Furthermore, an embodiment of the present invention provides a method and an apparatus for differently setting data transmission points of time of terminals through setting of a backoff time of a network node in a state in which the terminal and the network node are not connected to each other.

Furthermore, an embodiment of the present invention provides a method and an apparatus for avoiding a collision between data transmission and reception by differentially setting a backoff time for data transmission according to characteristics and a transmission direction of data between terminals.

The technical objects of the present invention are not limited to the aforementioned technical objects, and other technical objects, which are not mentioned above, will be apparently appreciated by a person having ordinary skill in the art from the following description.

Technical Solution

In order to solve the problem, the present invention provides a method and an apparatus for transmitting and receiving data by a device in a wireless communication system.

Specifically, the present invention provides a method for transmitting and receiving data, including: receiving a system information blocking comprising backoff information for a random access procedure from a base station, the back off information comprising a first minimum backoff time and a first maximum backoff time; selecting a random backoff time between the first minimum backoff time and the first maximum backoff time; transmitting a preamble for a random access to the base station after the selected random backoff time has elapsed; receiving a response message including resource information for transmitting data in response to the preamble; and transmitting the data to the base station based on the resource information.

Further, in the present invention, the first minimum backoff time and the first maximum backoff time are determined according to a characteristic of the data and the number of times of attempting a random access by the user equipment from the base station.

In addition, in the present invention, the random access purpose indicates whether the user equipment attempts the random access for transmission of uplink data or attempts the random access for reception of downlink data.

Further, in the present invention, the system information block further includes an identifier (ID) indicating whether to change the first minimum backoff time and the first maximum backoff time according to a transmission direction of the data.

In addition, in the present invention, when the identifier indicates the changes of the first minimum backoff time and the first maximum backoff time, the system information block further comprises a first change time for the change of the first minimum backoff time and a second change time for the change of the first maximum backoff time.

Further, in the present invention, the first minimum backoff time is changed based on the first change time, the first maximum backoff time is changed based on the second change time, and the random backoff time is selected between the changed first minimum backoff time and the changed first maximum backoff time.

In addition, in the present invention, the method further includes receiving configuration information for updating the first minimum backoff time and the first maximum backoff time, in which the configuration information comprises a second minimum backoff time and a second maximum backoff time.

Further, in the present invention, the first minimum backoff time is changed to the second minimum backoff time, and the first maximum backoff time is changed to the second maximum backoff time.

Further, in the present invention, the configuration information is transmitted through updated system information or the response message.

In addition, in the present invention, the system information further comprises at least one of time information indicating a time to which the first minimum backoff time and the first maximum backoff time are applied and duration information indicating a duration to which the first maximum backoff time is applied.

Further, in the present invention, the first minimum backoff time and the first maximum backoff time are set differently depending on the user equipment.

In addition, the present invention provides a user equipment including: a communication unit transmitting and receiving a radio signal to and from the outside; and a processor functionally coupled with the communication unit, in which the processor receives a system information block comprising backoff information for a random access from a base station, the backoff information comprising a first minimum backoff time and a first maximum backoff time, selects a random backoff time between the first minimum backoff time and the first maximum backoff time, transmits a preamble for a random access to the base station after the selected random backoff time has elapsed, receives a response message including resource information for transmitting data in response to the preamble, and transmits the data to the base station based on the resource information.

Advantageous Effects

The present invention has an advantage in that a terminal is not connected with a network node and transmits and receives data, thereby reducing latency of data transmission and reception.

Furthermore, the present invention has an advantage in that a network node differentially sets a backoff time according to an arbitrary connection purpose of a terminal to differentially allocate resources between the terminals.

Furthermore, the present invention has an advantage in that a network node differentially sets a backoff time according to an arbitrary connection purpose of a terminal to differentiate transmission points of time of data, thereby avoiding a collision between data transmission and reception.

Furthermore, the present invention has an advantage in that the network node sets the backoff time set according to the arbitrary connection purpose of the terminal to efficiently transmit and receive data according to requirements of data.

Advantages which can be obtained in the present invention are not limited to the aforementioned advantages and other unmentioned advantages will be clearly understood by those skilled in the art from the following description.

DESCRIPTION OF DRAWINGS

FIG. 3 illustrates one example of a component carrier and carrier aggregation in a wireless communication system to which the present invention can be applied and FIG. 4 illustrates a contention-based random access procedure in a wireless communication system to which the present invention can be applied.

FIG. 6 illustrates latency required for each process of a contention-based random access procedure required by the 3GPP LTE-A system to which the present invention can be applied.

FIG. 12 is a flowchart illustrating one example of a method for transmitting uplink data in a state in which UE is not connected with a network node to which the present invention may be applied.

FIG. 13 is a flowchart illustrating one example of a method for receiving downlink data in a state in which UE is not connected with a network node to which the present invention may be applied.

FIGS. 16 to 18 are diagrams illustrating one example of backoff information indicating a backoff time of the UE to which the present invention may be applied.

FIG. 22 is a diagram illustrating one example of a message format for transmitting backoff information to which the present invention may be applied.

MODE FOR INVENTION

Figure 1:
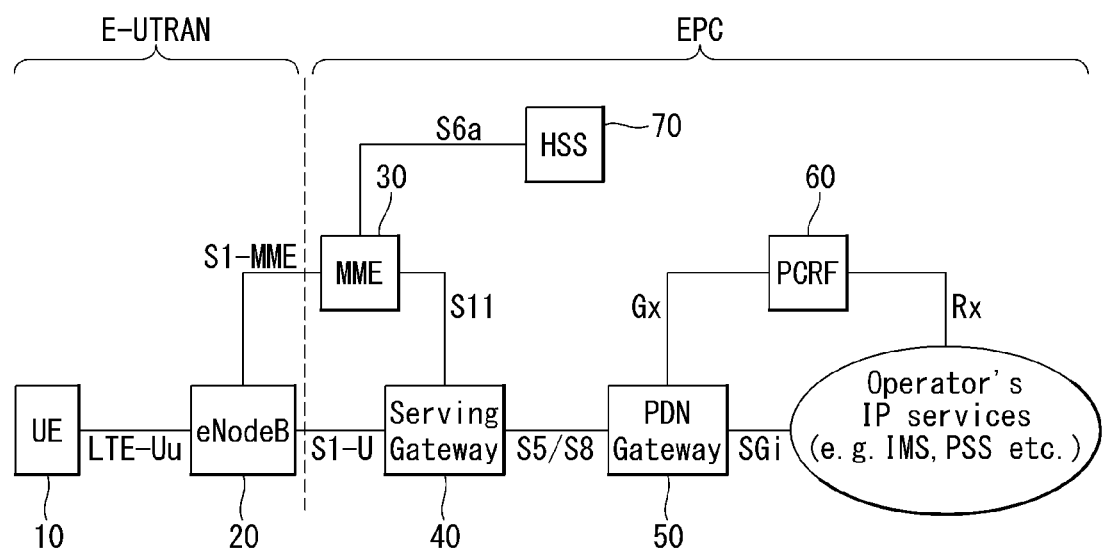
FIG. 1 is a view illustrating an Evolved Packet System (EPS) which is associated with the Long Term Evolution (LTE) system to which the present invention can be applied.

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In this specification, a base station has a meaning as a terminal node of a network that directly performs communication with a terminal. In this document, a specific operation described to be performed by a base station may be performed by an upper node of the base station according to circumstances. That is, it is evident that in a network including a plurality of network nodes including a base station, various operations performed for communication with a terminal may be performed by the base station or other network nodes other than the base station. A "base station (BS)" may be substituted with a term, such as a fixed station, a node B, an evolved-NodeB (eNB), a base transceiver system (BTS), an access point (AP), a network node.

Furthermore, the "terminal" may be fixed or may have mobility, and may be substituted with a term, such as a user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device or a device-to-device (D2D) device.

Hereinafter, the downlink (DL) means communication from a base station to a terminal, and the uplink (UL) means communication from a terminal to a base station. In the downlink, a transmitter may be part of a base station, and a receiver may be part of a terminal. In the uplink, a transmitter may be part of a terminal, and the receiver may be part of a base station.

Specific terms described in the following description are provided to help understanding of the present invention, and the use of such specific terms may be changed in other forms without departing the technical spirit of the present invention.

The following technology may be used for various radio access systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented as a radio technology, such as universal terrestrial radio access (UTRA) or CDMA2000. TDMA may be implemented as a radio technology, such as global system for mobile communications (GSM)/general packet radio service (GPRS)/enhanced data rates for GSM evolution (EDGE). OFDMA may be implemented as a radio technology, such as IEEE 802.11 (Wi-Fi), IEEE 802.16 (WiMAX), IEEE 802-20, or evolved UTRA (E-UTRA). UTRA is part of a universal mobile telecommunications system (UMTS). 3rd generation partnership project (3GPP) long term evolution (LTE) is part of an evolved UMTS (E-UMTS) using E-UTRA, and adopts OFDMA in the downlink and adopts SC-FDMA in the uplink. LTE-advanced (A) is the evolution of 3GPP LTE.

Embodiments of the present invention may be supported by standard documents disclosed in at least one of wireless access systems IEEE 802, 3GPP, and 3GPP2. That is, steps or portions of the embodiments of the present invention which are not described in order to clearly illustrate the technical spirit of the present invention may be supported by the documents. Further, all terms disclosed in the document may be described by the standard document.

For clarity of description, 3GPP LTE/LTE-A is mainly described, but the technical features of the present invention are not limited thereto and may be applied to a 5G system.

Hereinafter, before describing the present invention with reference to the accompanying drawings, the terms used in this specification will be briefly defined to facilitate understanding of the present invention.

EPS: Abbreviation of evolved packet system, which means a core network supporting a Long Term Evolution (LTE) network. Network of a form in which UMTS is evolved Public data network (PDN): Independent network in which a server providing a service is located Access point name (APN): Provided to UE as a name of an access point managed by a network. That is, the APN indicates a name (string) of the PDN. The corresponding PDN for transmission and reception of data is determined based on the name of the access point.

Tunnel endpoint identifier (TEID): End point ID of a tunnel set between nodes in the network, which is set for each UE in units of bearers.

MME: Abbreviation of mobility management entity, which serves to control each entity in the EPS to provide session and mobility for the UE.

Session: A session is a path for data transmission, of which unit may be a PDN, a bearer, or an IP flow.

A difference of each unit may be divided into a whole target network unit (APN or PDN unit), a unit (bearer unit) distinguished as QoS within the whole target network unit, and a destination IP address unit, as defined in 3GPP.

EPS Bearer: Logical path created between a terminal and a gateway where various kinds of traffic is transmitted and received.

Default EPS Bear: As a logical path for data transmission/reception that is basically generated when the terminal accesses the network, which may be maintained until the terminal detaches from the network.

Dedicated EPS Bearer: Logical path generated when necessary to provide additional services after the default EPS bearer is generated.

IP flow: Various kinds of traffic transmitted and received through the logical path between the terminal and the gateway.

Service Data Flow (SDF): IP flow of user traffic classified according to service type or combination of multiple IP flows.

PDN connection: Connection from the terminal to the PDN, that is, an association (connection) between the terminal represented by an IP address and the PDN represented by the APN. This means an entity-to-entity connection (terminal-PDN GW) in the core network so that the session may be formed.

UE Context: Context information of the UE used for managing the UE in the network, that is, context information constituted by UE ID, mobility (current location, etc.), session attributes (QoS, priority, etc.).

TIN: Temporary Identity used in Next update
P-TMSI: Packet Temporary Mobile Subscriber
TAU: Tracking Area Update
GBR: Guaranteed Bit Rate
GTP: GPRS Tunneling Protocol
TEID: Tunnel Endpoint ID
GUTI: Globally Unique Temporary Identity, identify know to MME.

FIG. 1 is a view illustrating an Evolved Packet System which is associated with the Long Term Evolution (LTE) system to which the present invention can be applied.

The LTE system aims to provide seamless Internet Protocol (IP) connectivity between a user equipment (UE, 10) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station (20), it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers.

As depicted in FIG. 1, the node (logical or physical) of the EPC in the SAE includes a Mobility Management Entity (MME) 30, a PDN gateway (PDN-GW or P-GW) 50, a Serving Gateway (S-GW) 40, a Policy and Charging Rules Function (PCRF) 60, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

In the present invention, the MME 30 corresponds to an entity in which a function necessary to process authentication of the UE and context information is implemented, where the MME 30 is described as one embodiment of the entity. Therefore, other devices in addition to the MME 30 can also carry out the corresponding function.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

In the present invention, the S-GW 40 corresponds to an entity in which a function necessary for processing authentication of the UE and context information is implemented, where the S-GW 40 is described as one embodiment of the entity. Therefore, other devices in addition to the S-GW 40 can also carry out the corresponding function.

The P-GW 50 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks.

In the present invention, the P-GW 50 corresponds to an entity in which a function necessary for processing routing/forwarding of user data is implemented, where the P-GW 50 is described as one embodiment of the entity. Therefore, other devices in addition to the P-GW 50 can also carry out the corresponding function.

The PCRF 60 performs policy control decision-making and performs flow-based charging.

The HSS 70 is also called a home location register (HLR), and includes an EPS-subscribed QoS profile and SAE subscription data including access control information for roaming. Furthermore, the HSS also includes information about a PDN accessed by a user. Such information may be maintained in an access point name (APN) form. The APN is a domain name system (DNS)-based label, and is an identity scheme that describes an access point for a PDN or a PDN address indicative of a subscribed IP address.

As shown in FIG. 1, various interfaces, such as S1-U, S1-MME, S5/S8, S11, S6a, Gx, Rx and SG, may be defined between EPS network elements.

Hereinafter, the concept of mobility management (MM) and an MM back-off timer are described in detail. The mobility management (MM) is a procedure for reducing overhead on the E-UTRAN and processing in a UE.

If the mobility management (MM) is applied, all of pieces of information related to a UE in an access network may be released during the cycle in which data is deactivated. The MME may maintain UE context and information related to a configured bearer during an Idle interval.

A UE may notify a network of a new location whenever it deviates from a current tracking area (TA) so that the network may contact the UE in the ECM-IDLE state. Such a procedure may be called "Tracking Area Update." This procedure may be called "Routing Area Update" in a universal terrestrial radio access network (UTRAN) or GSM EDGE radio access network (GERAN) system. The MME performs a function for tracking a user location while a UE is in the ECM-IDLE state.

If downlink data to be delivered to a UE in the ECM-IDLE state is present, the MME transmits a paging message to all of eNodeB on a tracking area (TA) with which the UE has been registered.

Next, the base station starts paging for the UE on a radio interface. When the paging message is received, the base station performs a procedure that enables the state of the UE to switch to the ECM-CONNECTED state. Such a procedure may be called a "Service Request Procedure." Accordingly, information related to the UE is generated in the E-UTRAN, and all of bearers are re-established. The MME performs the re-establishment of the radio bearers and a function of updating UE context on the base station.

If the mobility management (MM) procedure is performed, a mobility management (MM) backoff timer may be additionally used. Specifically, the UE may transmit tracking area update (TAU) in order to update the TA. The MME may reject a TAU request due to core network congestion. In this case, the MME may provide a time value related to the MM backoff timer. When the corresponding time value is received, the UE may activate the MM backoff timer.

Figure 2:
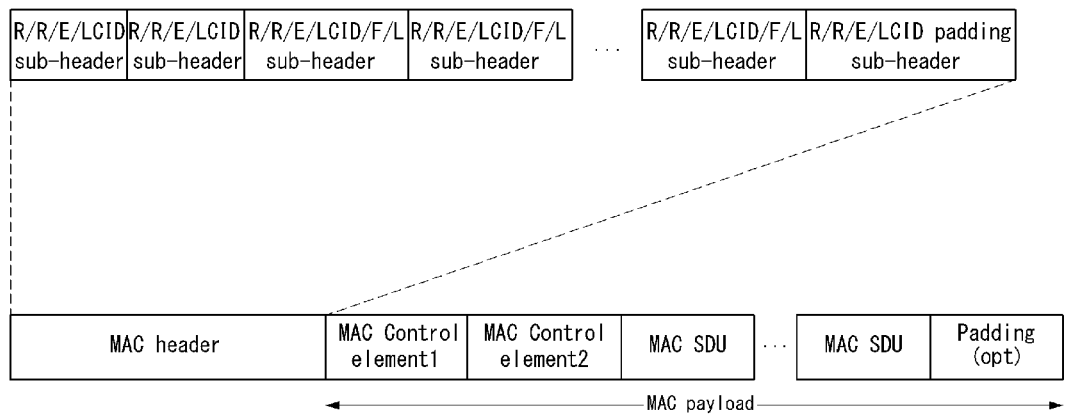
FIG. 2 illustrates a format of an MAC control element for reporting a buffer state in a wireless communication system to which the present invention can be applied.

FIG. 2 illustrates an MAC PDU used by an MAC entity in a wireless communication system to which the present invention can be applied.

With reference to FIG. 2, the MAC PDU includes an MAC header, at least one MAC service data unit (SDU), and at least one MAC control element; and may further comprise padding. Depending on the situation, at least one of the MAC SDU and the MAC control element may not be included in the MAC PDU.

As shown in FIG. 2, the MAC control element usually precedes the MAC SDU. And the size of the MAC control element can be fixed or varied. In case the size of the MAC control element is variable, whether the size of the MAC control element has been increased can be determined through an extended bit. The size of the MAC SDU can also be varied.

Figure 10:
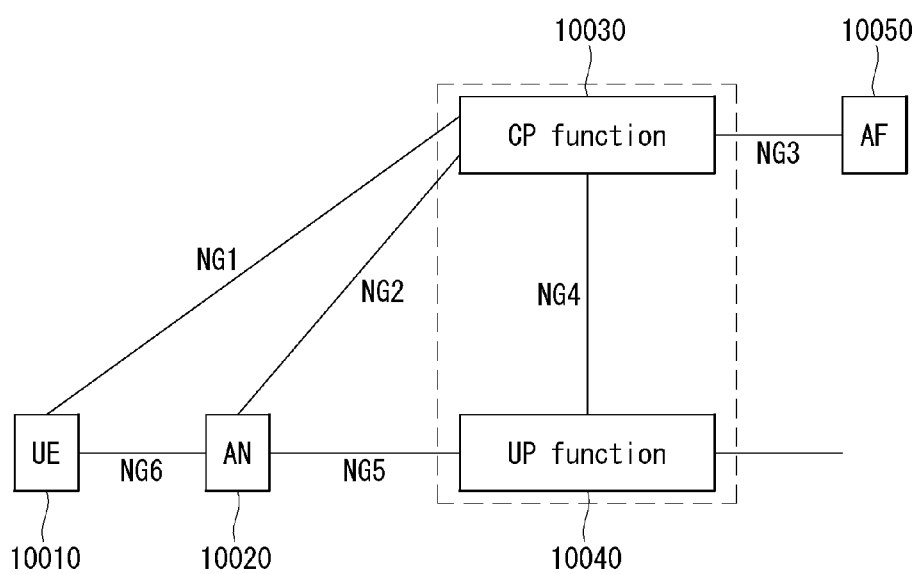
FIG. 10 is a diagram illustrating one example of a flow based QoS architecture to which the methods proposed by this specification may be applied.

The MAC header can include at least one or more sub-headers. At this time, at least one or more sub-headers included in the MAC header correspond to the MAC SDU, MAC control element, and padding, respectively, which the order of the sub-headers is the same as the disposition order of the corresponding elements. For example, as shown in FIG. 10, if the MAC PDU includes an MAC control element 1, an MAC control element 2, a plurality of MAC SDUs, and padding, sub-headers can be disposed in the MAC header so that a sub-header corresponding to the MAC control element 1, a sub-header corresponding to the MAC control element 2, a plurality of sub-headers corresponding respectively to the plurality of MAC SDUs, and a sub-header corresponding to padding can be disposed according to the corresponding order.

The sub-header included in the MAC header can include 6 header fields. More specifically, the sub-header can include 6 header fields of R/R/E/LCID/F/L.

As shown in FIG. 2, for the sub-header corresponding to the MAC control element of a fixed size and the sub-header corresponding to the last one among the data fields included in the MAC PDU, sub-headers including 4 header fields can be used. Therefore, in case a sub-header includes 4 fields, the four fields can be R/R/E/LCID.

Figure 4:
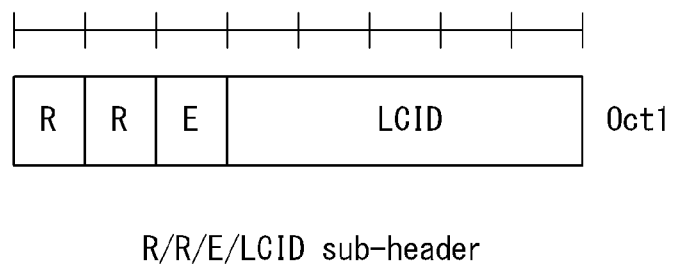

FIGS. 3 and 4 illustrate a sub-header of an MAC PDU in a wireless communication system to which the present invention can be applied.

In the following, each field is described with reference to FIGS. 3 and 4.

1) R: Reserved bit, not used.

2) E: Extended bit, indicating whether the element corresponding to a sub-header is extended. For example, if E field is '0', the element corresponding to the sub-header is terminated without repetition; if E field is '1', the element corresponding to the sub-header is repeated one more time and the length of the element is increased twice of the original length.

3) LCID: Logical Channel Identification. This field is used for identifying a logical channel corresponding to the MAC SDU or identifying the corresponding MAC control element and padding type. If the MAC SDU is related to a sub-header, this field then indicates a logical channel which the MAC SDU corresponds to. If the MAC control element is related to a sub-header, then this field can describe what the MAC control element is like.

Table 1 shows the LCID values for DL-SCH.

TABLE 1

| Index | LCID values |
| --- | --- |
| 00000 | CCCH |
| 00001-01010 | Identity of the logical channel |
| 01011-11001 | Reserved |
| 11010 | Long DRX Command |
| 11011 | Activation/Deactivation |

TABLE 1-continued

| Index | LCID values |
| --- | --- |
| 11100 | UE Contention Resolution Identity |
| 11101 | Timing Advance Command |
| 11110 | DRX Command |
| 11111 | Padding |

Table 2 shows LCID values for an UL-SCH.

TABLE 2

| Index | LCID values |
| --- | --- |
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

In the LTE/LTE-A system, a UE can report its buffer state to the network by setting an index value for any of a truncated BSR in the LCID field, a short BSR, and a long BSR.

The index values and a mapping relationship of the LCID values of Tables 1 and 2 are shown for an illustrative purpose, and the present invention is not limited to the example.

4) F: Format field. Represents the size of the L field

5) L: Length field. Represents the size of the MAC SDU corresponding to a sub-header and the size of the MAC control element. If the size of the MAC SDU corresponding to a sub-header or the size of the MAC control element is equal to or smaller than 127 bits, 7 bits of the L field can be used (FIG. 9(a)) and 15 bits of the L field can be used for the other cases (FIG. 9(b)). In case the size of the MAC control element varies, the size of the MAC control element can be defined through the L field. In case the size of the MAC control element is fixed, the F and the L field may be omitted as shown in FIG. 10 since the size of the MAC control element can be determined without defining the size of the MAC control element through the L field.

Figure 5:
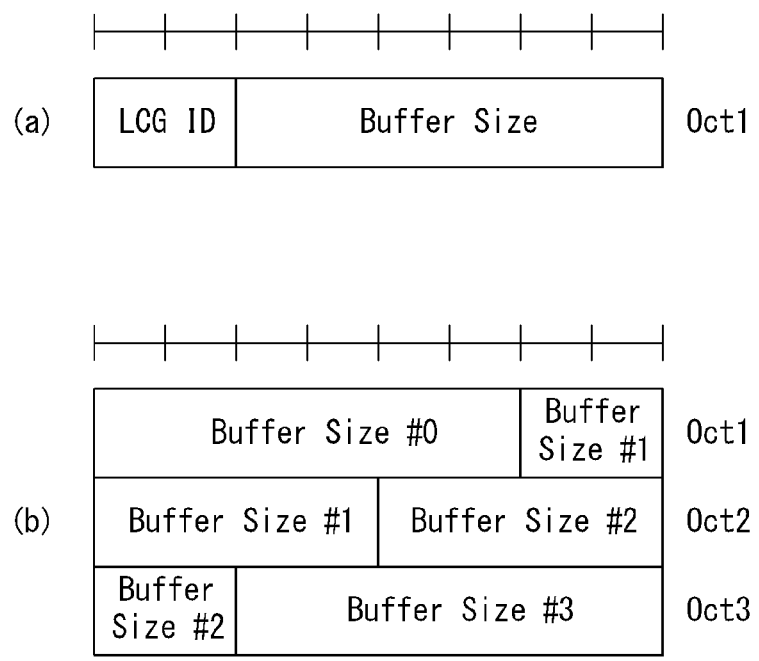
FIG. 5 illustrates a non-contention based random access procedure in a wireless communication system to which the present invention can be applied.

FIG. 5 illustrates a format of an MAC control element for reporting a buffer state in a wireless communication system to which the present invention can be applied.

In case the truncated BSR and short BSR are defined in the LCID field, the MAC control element corresponding to a sub-header can be configured to include a logical channel group identification (LCG ID) field and a buffer size field indicating a buffer state of the logical channel group as shown in FIG. 5(a). The LCG ID field is intended to identify a logical channel group to which to report a buffer state and can have the size of two bits.

The buffer size field is intended to identify the total amount of data available for all of the logical channels belonging to a logical channel group after the MAC PDU is created. The available data include all of the data that can be transmitted from the RLC layer and the PDCP layer, and the amount of data is represented by the number of bytes. The buffer size field can have the size of 6 bits.

In case a long BSR is defined for the LCID field of a sub-header, the MAC control element corresponding to a sub-header can include 4 buffer size fields indicating buffer states of the four groups having LCG IDs ranging from 0 to 3 as shown in FIG. 5(b). Each buffer size field can be used to identify the total amount of data available for each logical channel group.

However, there is a problem that a terminal that does not establish a logical path (for example, DRB or SRB1/2) due to no RRC connection between the terminal and the base station does not have an LGC ID.

Accordingly, the present invention proposes a method for transmitting uplink data by allocating uplink resources according to the size and characteristics of the uplink data from the base station by the UE even in a state where an RRC connection is not established between the UE and the bases station.

Uplink Resource Allocation Procedure

In the case of the 3GPP LTE/LTE-A system, a method for data transmission and reception based on scheduling of an eNB is used to maximize utilization of radio resources. This again implies that in case a UE has data to transmit, the UE requests the eNB to allocate uplink resources in the first place and is capable of transmitting data by using only the uplink resources allocated by the eNB.

FIG. 6 illustrates an uplink resource allocation process of a UE in a wireless communication system to which the present invention can be applied.

For efficient use of radio resources in uplink transmission, an eNB needs to know which data and how much of the data to transmit to each UE. Therefore, the UE transmits to the eNB the information about uplink data that the UE attempts to transmit directly, and the eNB allocates uplink resources to the corresponding UE in accordance to the UE's transmission. In this case, the information about uplink data that the UE transmits to the eNB is the amount of uplink data stored in the UE's buffer, which is called buffer status report (BSR). When radio resources on the PUSCH are allocated during a current TTI and a reporting event is triggered, the UE transmits the BSR by using the MAC control element.

FIG. 6(a) illustrates an uplink resource allocation process for actual data in case the uplink radio resources for buffer status reporting are not allocated to the UE. In other words, in the case of a UE making a transition from the DRX mode to an active mode, since no data resources are allocated beforehand, the UE has to request resources for uplink data, starting with SR transmission through the PUCCH, and in this case, an uplink resource allocation procedure of five steps is employed.

FIG. 6(a) illustrates the case where the PUSCH resources for transmitting BSR are not allocated to the UE, and the UE first of all transmits a scheduling request (SR) to the eNB to receive PUSCH resources S6010.

The scheduling request is used for the UE to request the eNB to allocate the PUSCH resources for uplink transmission in case radio resources are not scheduled on the PUSCH during a current TTI although a reporting event has occurred.

In other words, when a regular BSR has been triggered but uplink radio resources for transmitting the BSR to the eNB are not allocated to the UE, the UE transmits the SR through the PUCCH. Depending on whether the PUCCH resources for SR have been configured, the UE may transmit the SR through the PUCCH or starts a random access procedure. More specifically, the PUCCH resources through the SR can be transmitted are set up by an upper layer (for example, the RRC layer) in a UE-specific manner, and the SR configuration include SR periodicity and SR sub-frame offset information.

If the UE receives from the eNB an UL grant with respect to the PUSCH resources for BSR transmission S6020, the UE transmits the BSR to the eNB, which has been triggered through the PUSCH resources allocated by the UL grant S6030.

By using the BSR, the eNB checks the amount of data for the UE to actually transmit through uplink transmission and transmits to the UE an UL grant with respect to the PUSCH resources for transmission of actual data S6040. The UE, which has received the UL grant meant for transmission of actual data, transmits to the eNB actual uplink data through the allocated PUSCH resources S6050.

FIG. 6(b) illustrates an uplink resource allocation process for actual data in case the uplink radio resources for buffer status reporting are allocated to the UE.

FIG. 6(b) illustrates the case where the PUSCH resources for BSR transmission have already been allocated to the UE; the UE transmits the BSR through the allocated PUSCH resources and transmits a scheduling request to the eNB along with the BSR transmission S6110. Next, by using the BSR, the eNB check the amount of data that the UE actually transmits through uplink transmission and transmits to the UE an UL grant with respect to the PUSCH resources for transmission of actual data S6120. The UE, which has received an UL grant for transmission of actual data, transmits actual uplink data to the eNB through the allocated PUSCH resources S6130.

Random Access Procedure (RACH)

Figure 7:
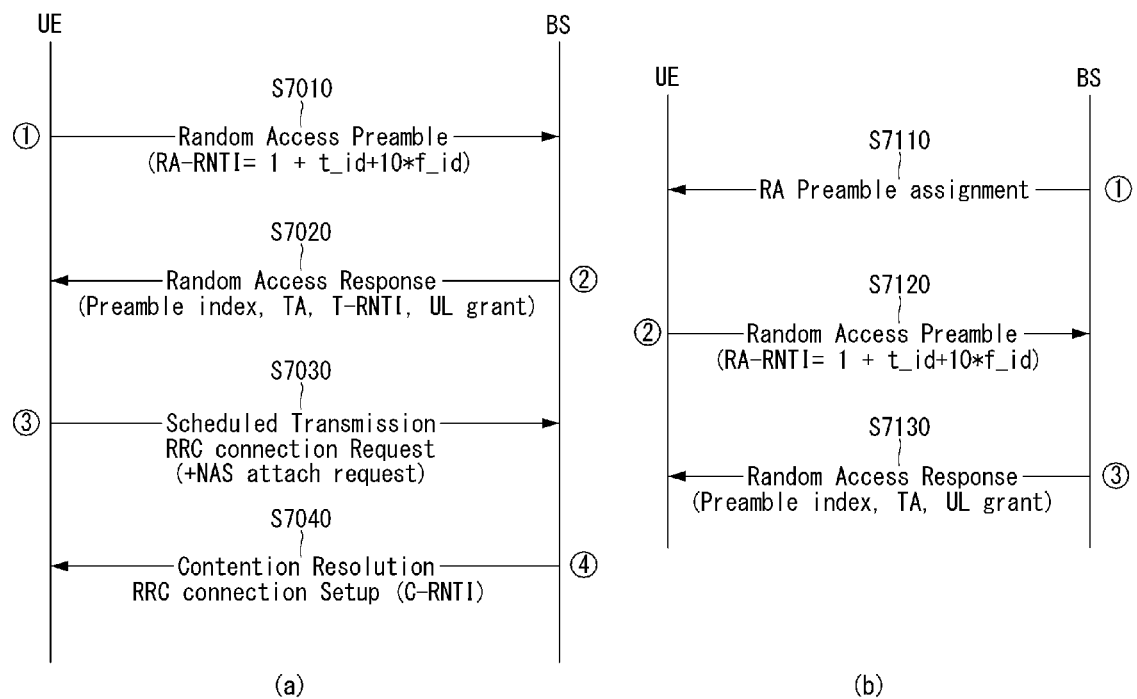
FIG. 7 illustrates one example of a random access procedure in the LTE system.

FIG. 7 illustrates one example of a random access procedure in the LTE system.

The UE carries out the random access procedure (RACH) at the time of the initial connection in the RRC_IDLE state, initial connection after radio link failure, handover requiring the RACH, and generation of uplink or downlink data requiring the RACH while in the RRC_CONNECTED state. Part of RRC messages such as the RRC connection request message, cell update message, and UTRAN Registration Area (URA) update message are also transmitted through the random access procedure. Logical channels such as Common Control Channel (CCCH), Dedicated Control Channel (DCCH), and Dedicated Traffic Channel (DTCH) can be mapped to a transmission channel RACH. A transmission channel RACH is mapped to a physical channel such as the Physical Random Access Channel (PRACH).

If the UE's MAC layer commands the UE's physical layer to start PRACH transmission, the UE's physical layer first selects one access slot and one signature to transmit the PRACH preamble to the uplink. Two types of random access procedure are defined: contention based and non-contention based random access procedure.

FIG. 7(a) illustrates one example of a contention based random access procedure, while FIG. 7(b) illustrates one example of a non-contention based random access procedure.

First, contention based random access procedure will be described with reference to FIG. 7(a).

The UE receives information about random access from the eNB through system information and stores the received information. Afterwards, in case random access is required, the UE transmits a random access preamble (which is also called a message 1) to the base station S7010.

If the eNB receives a random access preamble from the UE, the eNB transmits a random access response (which is also called a message 2) to the UE S7020. To be specific, downlink scheduling information with respect to the random access response message is CRC masked with a Random Access-Radio Network Temporary Identifier (RA-RNTI) and transmitted on the L1 or L2 control channel (PDCCH). The UE, having receiving a downlink scheduling signal masked with the RA-RNTI, receives a random access response message from a Physical Downlink Shared Channel (PDSCH) and decodes the received random access response message. Afterwards, the UE checks the random access response message whether it contains random access response information directed to the UE.

Existence of random access response information directed to the UE can be determined by checking a Random Access Preamble ID (RAID) with respect to a preamble that the UE has transmitted.

The random access response information includes Timing Alignment (TA) representing timing offset information for synchronization, allocation information of radio resources used for uplink, and a temporary C-RNTI for UE identification.

In case random access response information is received, the UE carries out uplink transmission (which is also called a message 3) to a uplink Shared Channel (SCH) according to the radio resource allocation information included in the response information. At this time, uplink transmission may be expressed as scheduled transmission.

After receiving the uplink transmission from the UE, the eNB transmits a message for contention resolution (which is also called a message 4) to the UE through a Downlink Shared Channel (DL-SCH) S7040.

Next, non-contention based random access procedure will be described with reference to FIG. 7(*b*).

Before the UE transmits a random access preamble, the eNB allocates a non-contention based random access preamble to the UE S7110.

The non-contention based random access preamble can be allocated through a handover command or dedicated signaling such as a PDCCH. In case a non-contention based random access preamble is allocated to the UE, the UE transmits the allocated non-contention based random access preamble to the eNB S7120.

Afterwards, the eNB is able to transmit a random access response (which is also called a message 2) to the UE similarly to the S7020 step of the contention based random access procedure S7130.

Although HARQ has not been applied to the random access response during the random access procedure above, the HARQ can be applied to uplink transmission with respect to the random access response or a message for contention resolution. Therefore, the UE doesn't necessarily have to transmit ACK or NACK with respect to the random access response.

Next, a UL data transmission method in the LTA(-A) or 802.16 system will be described briefly.

A cellular system such as the LTE(-A) or 802.16m system employs an eNB scheduling-based resource allocation method.

In a system which employs the eNB scheduling based resource allocation method, the UE with data to be transmitted (i.e., UL data) requests resources for transmission of the corresponding data from the eNB before transmitting the data.

The scheduling request of the UE can be carried out through Scheduling Request (SR) transmission to a PUCCH or Buffer Status Report (BSR) transmission to a PUSCH.

Also, in case resources used for transmitting SR or BSR are not limited to the UE, the UE can request uplink resources from the eNB through an RACH procedure.

As described above, the eNB which has received a scheduling request from the UE allocates uplink resources to be used for the corresponding UE through a downlink control channel (i.e., UL grant message or DCI in the case of the LTE(-A) system).

At this time, a UL grant transmitted to the UE may be used to inform the UE of which subframe the resources allocated to the UE correspond to through explicit signaling, but the UL grant may be used to define a predefined timing between the UE and the eNB for resource allocation with respect to a subframe after specific time (for example, 4 ms in the case of the LTE system).

As described above, the eNB's allocating resources to the UE after X ms (for example, 4 ms in the case of the LTE(-A) system) implies that the UE allocates resources by taking into account all of the time periods for the UE to receive and decode a UL grant, to prepare data to be transmitted, and to encode the prepared data.

EMM and ECM State

EPS mobility management (EMM) and an EPS connection management (ECM) state are described.

Figure 8:
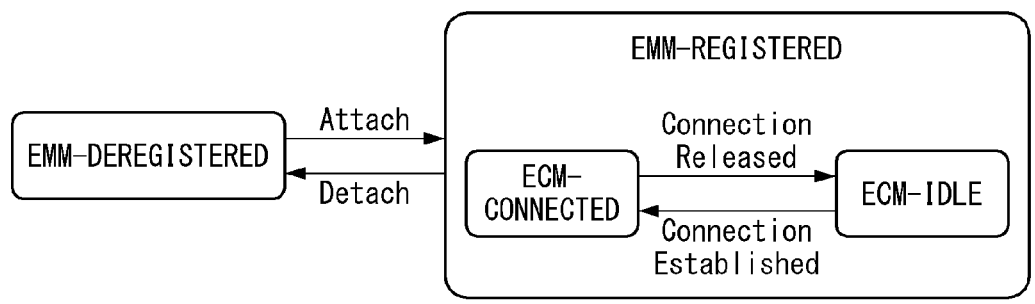
FIG. 8 is a diagram illustrating EMM and an ECM state in a wireless communication system to which the present invention may be applied.

FIG. 8 is a diagram illustrating EMM and an ECM state in a wireless communication system to which the present invention may be applied.

Referring to FIG. 8, in order to manage the mobility of a terminal in the NAS layer located in the control plane of the terminal and the MME, an EMM registration state (EMM-REGISTERED) and an EMM deregistration state (EMM-DEREGISTERED) may be defined depending on whether the terminal has been attached to or detached from a network. The EMM-REGISTERED state and the EMM-DEREGISTERED state may be applied to the terminal and the MME.

At the initial stage, such as a case where a terminal is first powered on, the terminal is in the EMM-DEREGISTERED state. In order to access the network, the terminal performs a process of registering with the corresponding network through an initial attach procedure. When the connection procedure is successfully performed, the terminal and the MME make transition to the EMM-REGISTERED state. Furthermore, if the terminal is powered off or a radio link fails (if a packet error rate exceeds a reference value on the radio link), the terminal is detached from the network and makes transition to the EMM-DEREGISTERED state.

Further, an ECM connected state and an ECM idle state may be defined in order to manage the signaling connection between the UE and the network. The ECM connected state and the ECM idle state may also be applied to the UE and the MME.

Further, the RRC state between the UE and the BS indicates whether the RRC layer of the UE and the RRC layer of the BS are logically connected. That is, when the RRC layer of the UE and the RRC layer of the BS are connected, the UE is in the RRC_CONNECTED state. When the RRC layer of the UE and the RRC layer of the BS are not connected, the UE is in the RRC_IDLE state.

Form in which ECM State is Linked with RRC State

The ECM connection is constituted by the RRC connection configured between the UE and the BS and the S1 signaling connection established between the BS and the MME. That is, the ECM connection is configured/cancelled means that both the RRC connection and the S1 signaling connection are configured/cancelled.

The network may grasp the existence of the UE in the ECM connected and RRC connected states in a cell unit and effectively control the UE.

On the contrary, the network may not determine the existence of the UE in the ECM idle state and is managed by the unit of the tracking area which is the larger region unit than the cell by a core network (CN). When the UE is in the ECM idle state, the UE performs discontinuous reception (DRX) configured by the NAS using an ID uniquely allocated in the tracking area. That is, the UE may receive broadcasts of system information and paging information by monitoring the paging signal at a specific paging time for each UE-specific paging DRX cycle.

Further, when the UE is in the ECM idle state, the network has no context information of the UE. Accordingly, the UE in the ECM idle state performs a UE-based mobility-related procedure such as cell selection or cell reselection without receiving the command of the network. When the position of the UE in the ECM idle state is different from the position known by the network, the UE notifies the corresponding position of the UE to the network through a tracking area update (TAU) procedure.

On the contrary, when the UE is in the ECM connected and RRC connected states, the mobility of the UE is managed by the command of the network. The network knows the cell to which the UE belongs in the ECM connected and RRC connected states. Thus, the network may transmit and/or receive data to/from the UE, control mobility such as UE handover, and perform cell measurements for the adjacent cell.

As described above, in order for the UE to receive a normal mobile communication service such as voice or data, the UE needs to be transitioned to the ECM connected and RRC connected states. The initial UE is in the ECM idle state similar to the EMM state as in the case where the UE is first turned on and when the UE is successfully registered in the corresponding network through the initial attach procedure, the UE and the MME are transitioned to the ECM connected state. Further, when the UE is registered in the network but the traffic is inactivated and the radio resource is not thus allocated, the UE is in the ECM idle state and when new uplink or downlink traffic is generated in the UE, the UE and the MME is transitioned to the ECM connected state.

Form in which ECM State is not Linked with RRC State

The ECM connection is constituted by the RRC connection established between the UE and the BS and the S1 signaling connection established between the BS and the MME, but may be irrespective of the RRC state. That is, even though the RRC state is transitioned from the connection state to the idle state, the ECM state between the UE and the MME may maintain the connection state.

The operations of the network/BS and the UE in the ECM-CONNECTED & RRC-CONNECTED state and the ECM-IDLE state may be the same as that in the state in which the ECM state is linked with the RRC state described above.

The network in the ECM-CONNECTED & RRC-IDLE state is performed in the same manner as the operation in the ECM-CONNECTED state, and may manage the mobility of the terminal in a specific unit of the BS and the UE and reconfigure a route of connection (e.g., S1 signaling connection and S2 data connection) with the MME/S-GW.

Therefore, the UE may perform other operations according to a state thereof as follows.

ECM-IDLE

Transmission of messages for ECM and RRC connection state transitions

ECM-CONNECTED & RRC-IDLE (excluding RRC-IDLE of UE depending on radio link failure): Message transmission for RRC connection state transition and connection resumption ECM-CONNECTED & RRC-IDLE (RRC-IDLE of UE depending on radio link failure): Message transmission for RRC connection reconfiguration Next, an example of a wireless communication system architecture for supporting a next-generation RAN to which methods proposed by this specification may be applied will be described with reference to FIGS. 9 to 11.

Figure 9:
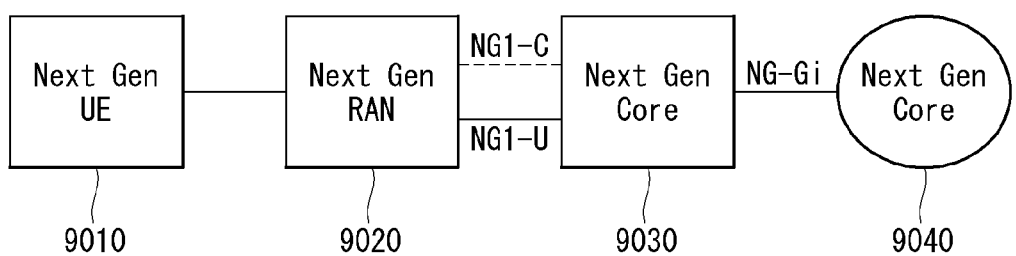
FIG. 9 is a diagram illustrating one example of a wireless communication system architecture for supporting a next-generation RAN to which methods proposed by this specification may be applied.

FIG. 9 is a diagram illustrating one example of a wireless communication system architecture for supporting a next-generation RAN to which methods proposed by this specification may be applied.

The wireless communication system structure for supporting the next-generation RAN may be expressed as a 'high level architecture'.

A next generation may be briefly expressed as "Next Gen" or the like and the next generation may collectively refer to terms referring to future communication generations including 5G and the like.

For easy description, the next generation will hereinafter be referred to as "Next Gen".

The structure of the "Next Gen" may support new RAT(s), evolved LTE, and non-3GPP access types.

Examples of the non-3GPP access types may include WLAN access, Fixed access, and the like.

In addition, the "Next Gen" structure supports a unified authentication framework for other access systems and supports simultaneous connection with multiple UE through multiple access technologies.

In addition, the "Next Gen" structure allows independent evolution of the core network and RAN and minimizes access dependency.

In addition, the "Next Gen" structure supports separation of control plane and user plane functions and supports transmission of IP packets, non-IP PDUs, and Ethernet frames.

Referring to FIG. 9, the "Next Gen" structure may include NextGen UE 910, NextGen RAN 920, NextGen Core 930, and Data network 940.

Here, in the wireless communication system of the "Next Gen", the UE may be expressed as 'NextGen UE', the RAN defining the radio protocol structure between the UE and the BS may be expressed as 'NextGen RAN', and the core network may be expressed as 'NextGen Core'.

As an example, 'NextGen RAN' may correspond to E-UTRAN in the LTE(-A) system, 'NextGen Core' may correspond to EPC in the LTE(-A) system, and network entities performing functions including MME, S-GW, P-GW, etc., in the LTE EPC may also be included in the NextGen Core.

An NG1-C interface and an NG1-U interface exist between the NextGen RAN and the NextGen Core and an NG-Gi interface exists between the NextGen Core and the Data Network.

Here, NG1-C represents a reference point for the control plane between the NextGen RAN and the NextGen Core and NG1-U represents a reference point for the user plane between the NextGen RAN and the NextGen Core.

Figure 15:
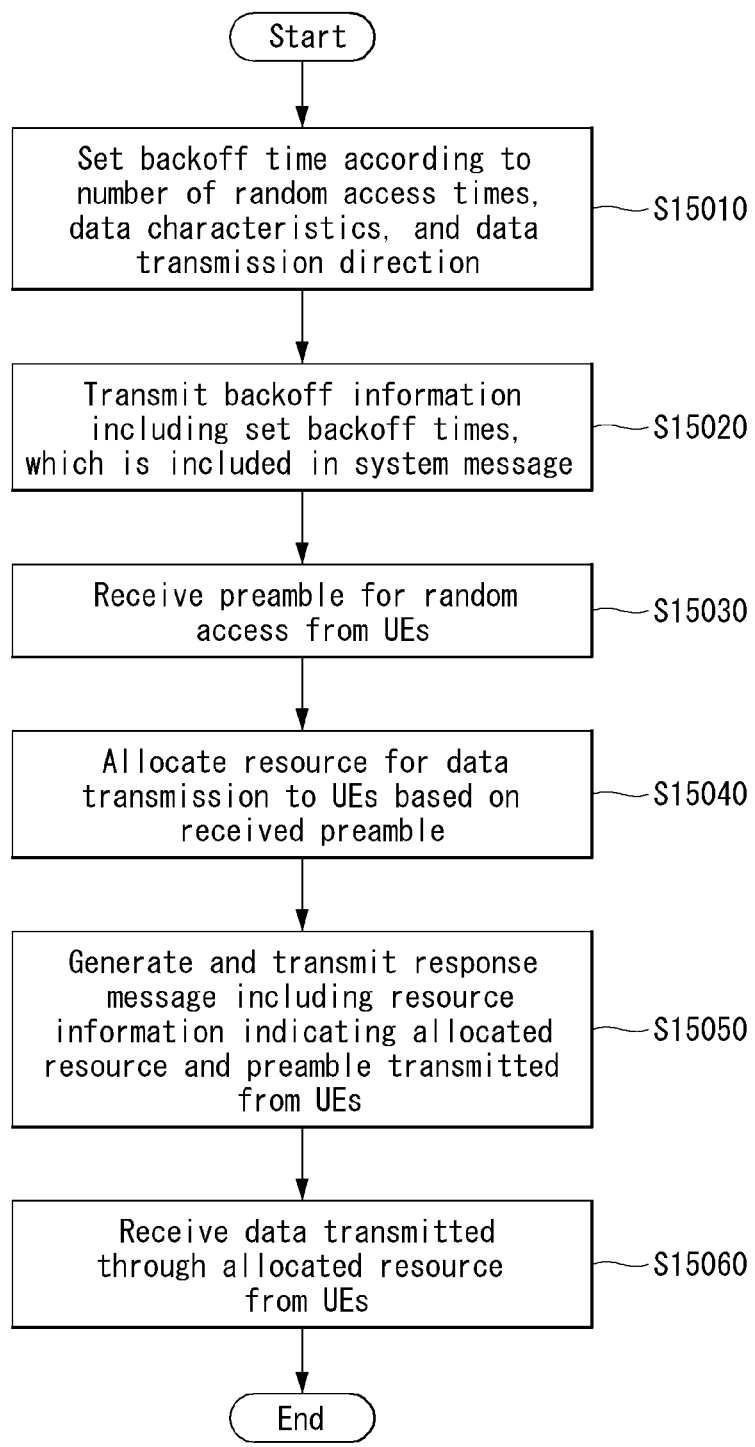
FIG. 15 is a flowchart illustrating one example of an operating method of a base station for differentially setting a backoff time between UEs to which the present invention may be applied.

Although not illustrated in FIG. 15 above, NG-NAS represents a reference point for the control plane between the NextGen UE and the NextGen Core.

Further, NG-Gi represents a reference point between the NextGen Core and the data network.

Here, the data network may be an operator external public network or a private data network or an intra-operator data network.

FIG. 10 is a diagram illustrating one example of a flow based QoS architecture to which the methods proposed by this specification may be applied.

In particular, FIG. 10 specifically illustrates the interface between UE, AN, and AF in detail by dividing the NextGen Core of FIG. 9 above into a control plane (CP) function and a user plane (UP) function.

Referring to FIG. 10, a flow-based QoS handling method will be described in more detail.

Referring to FIG. 10, a policy of a quality of service (QoS) in a wireless communication system to which the present invention is applied may be stored and configured in a control plane (CP) function 10030 for the following reasons.

Application in a user plane (UP) function 10040

Transmission in an admission control 29020 and a UE 10010 for QoS application

Hereinafter, parameters for defining the QoS framework will be described.

Flow Priority Indicator (FPI): Represents a parameter for defining the priority of each flow processing in UP functions 10040 and AN functions 10020. This corresponds to a scheduling priority and a priority in a congestion case.

Further, the FPI indicates whether the flow requires a guaranteed flow bit rate and/or a maximum flow bit rate.

Flow Descriptor: Packet filters related with a specific flow process. Identification in the uplink needs to be performed in the UE and the AN 10020, but is limited to layer 3 and layer 4.

Maximum Flow Bitrate (MFB): parameter indicating uplink and downlink bit rate values which may be applied for one flow or a combination of flows.

The parameter represents a maximum authorized bit rate authorized for a data flow.

Flow Priority Level (FPL): Parameter for defining a static significance of the flow for accessing the AN (10020) resource. Additionally, the FPL indicates whether to access an AN (10020) non-prioritized resource. The AN non-prioritized resource needs to be an allocated resource that is either pre-emptable or protected from pre-emption.

Session Bit rate: parameter indicating the bit rate value in the uplink and downlink for establishing a user session. The Session Bitrate parameter represents the maximum bit rate allowed for the user session.

The support of the GFP in the UE depends on a QoS design of the radio interface.

As illustrated in FIG. 10 above, the CP functions and the UP functions are functions included in the NextGen CN (indicated by a dotted line) and may be implemented by one physical device or by different physical devices.

Figure 11:
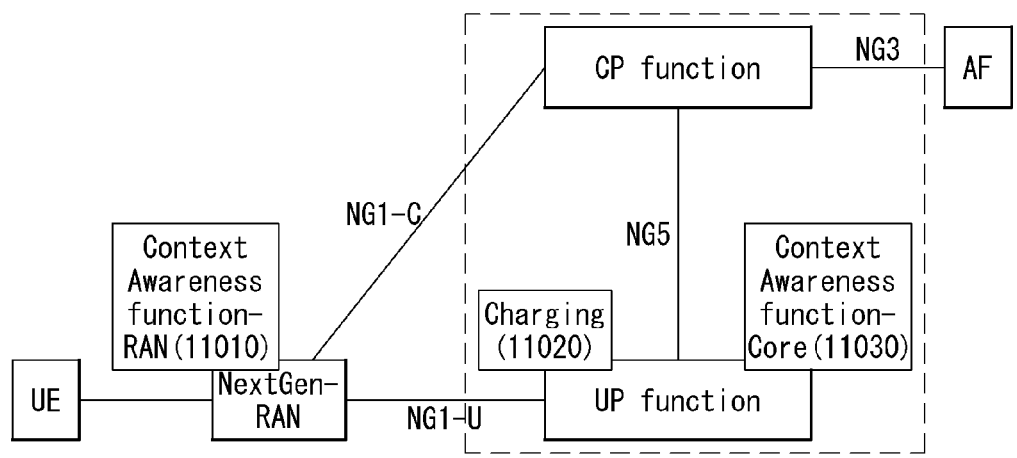
FIG. 11 is a diagram illustrating one example of an interaction between network functions and a function.

FIG. 11 is a diagram illustrating one example of a QoS architecture used in a QoS framework to which the methods proposed by this specification may be applied.

Content Requirement Awareness Function in the Core (CAF-Core)

The CAF-Core 11030 supports a mechanism for identifying application sessions (e.g., downloading video, downloading web pages, listening to music, posting for a social media network, etc.) and enforcing QoS policies associated with the discovered applications.

The CAF-Core receives the QoS policies from a Core CP. Application discovery is accomplished by means of non-standardized algorithms (e.g., usage patterns, heuristics, SNF discovery for encrypted traffic, etc.).

The CAF performs QoS enforcement on the CN based on the QoS policies received from the Core Cp.

The CAF-Core may handle the QoS policies and obtain dynamic QoS targets and local enforcement actions in the CN.

In addition, the CAF-Core may update the dynamic QoS targets and the local enforcement actions in real time based on current content requirements of user plane traffic mix, simultaneous competing flows, and network status and resource availability within the limits of the QoS policies provided by the NG Core CP functions. As such, the CAF-Core enforces the QoS policies within the given policy limits and will not deviate out of any range.

Content Requirement Awareness Function in the RAN (CAF-RAN)

The CAF-RAN 11010 supports a mechanism for identifying the application sessions (e.g., downloading video, downloading web pages, listening to music, posting for a social media network, etc.) and enforcing the QoS policies.

The CAF-RAN receives the QoS policies from the Core CP. The CAF-RAN may use the application discovery information provided by the Core, the application discovery information may imply additional specific requirements for a certain application session, and at the same time, may form traffic for a given session. The CAF-RAN performs QoS enforcement based on the QoS policies received from the Core CP. This includes traffic forming for DL and UL. The DL traffic forming helps control the flow of UL traffic.

The CAF-RAN may handle the QoS policies and obtain the dynamic QoS targets and local enforcement actions in the RAN. In addition, the CAF-RAN may update the dynamic QoS targets and the local enforcement actions in real time based on the current content requirements of user plane traffic mix, simultaneous competing flows, and network status and resource availability within the limits of the QoS policies provided by the NG Core. As such, the CAF-RAN enforces the QoS policies within the given policy limits and will not deviate out of any range.

The RAN is limited by the charging performed in the core and thus has no effect on the charging performed in the UP function in the core. The amount of specific traffic charged by the core is provided to the RAN in conjunction with packet marking with application marking and the CAF-RAN enforces and conserves the charged capacity in relation to the bits.

Coordination Between CAF-Core and CAF-RAN

The CAF-Core may perform the application discovery and provide information in the form of the packet marking based on the policies received from the CN CP.

The traffic forming and the policy enforcement in the CAF-RAN are limited by the packet marking represented by the policies received from the CAF-Core and the CN CP. This helps the CAF-Core and the CAF-RAN to operate in a cooperative manner and the charging is also performed for the application represented by the CAF-Core.

Next, the CN CP function and the CN UP function will be described.

The CN CP function and the CN UP function may be implemented by one physical device or respective physical devices.

CN CP Function

The QoS policies are stored in the CN CP Functions. In session formation, Subscriber and application specific policies are transmitted to the RAN and the CAF which exists in the CN UP function.

CN UP Function

In the core, the UP function is responsible for traffic charging support (CDR, granted quota for on-line) based on policies that take into account an outcome of the CAF. Further, the CN UP function marks downlink traffic transmitted to the RAN.

Policy Provisioning and Enforcement

The operator supplies specific QoS policies to the subscribers and applications of the NG Core Cp function. The CP function of the Core provides the policies to the RAN and CN UP functions.

The enforcement actions are obtained from the policy points according to the current content requirements of the user plane traffic mix, simultaneous competing flows, and network status and resource availability.

Charging

Traffic charging (11020) support (CDR, granted quota for on-line) based on policies that take into account an outcome of the CAF is performed in the CN UP function.

Multiple Levels of Policies

The following shows different configurations of the QoS policies provided by the UP functions and the RAN.

Intent level QoS policies that show the configuration of floors may be identified by the packet marking, SDF descriptor, and the like in an abstract QoS target (e.g., Voice type Qos, Smoothed Bit rate Qos (limit the bandwidth variation for the traffic), bulk traffic (when a radio condition is bad or a load on the cell is excessive, the traffic may be discarded)).

Transmission QoS level policies that show the configuration of the floor may be identified by the packet marking, the SDF descriptors, etc. in explicit QoS targets (priority, delay, jitter, etc.).

The CP functions of the CAF-RAN and the CAF-Core are responsible for local CAF policies and Transport locally map Intent level QoS policies which belong to QoS level policies based on local (radio) conditions (current context of user plane traffic mix, simultaneous competing flows and network status and resource availability) and are limited by upper limits of Intent level QoS policies.

Parameters Required for QoS Framework

The following parameters are required for defining the QoS framework.

Policy description:

Scope of definition: Application name or application type

Definition of Intent: High Definition experience for RT Multimedia or explicit QoS target level (e.g., 150 ms maximum packet delay for IMS video)

Maximum Flow Bitrate: UL and DL bit rate values that may be applied for a single PDU session or a combination of PDU sessions for given UE.

Allocation and Retention Priority level (ARP): A priority level that indicates the per-emption capability and the pre-emption vulnerability for a given PDU session.

FIG. 12 is a flowchart illustrating one example of a method for transmitting uplink data in a state in which UE is not connected with a network node to which the present invention may be applied.

FIGS. 12(*a*) and 12(*b*) illustrate a process in which the UE transmits uplink data by being allocated resources from the BS in a process of performing the random access procedure without establishing the connection with the BS.

In this case, the procedure for transmitting/receiving data in a state where the UE is not connected to the BS (for example, the RRC_Idle state and the ECM_Idle state) may be called a connectionless based data transmission procedure or an RRC connectionless transmission procedure.

Referring to FIG. 12(*a*), the UE performs the random access procedure in order to acquire a radio resource for transmitting uplink data (S12010). In this case, the random access procedure means performing only steps S7010 and S7020 described in FIG. 7(*a*).

That is, the random access procedure means only a step in which the UE transmits the random access preamble to the BS and receives the random access response message in response to the random access preamble.

In this case, the random access response message may include an index of a preamble discovered by the BS, timing alignment (TA) indicating timing offset information for synchronization, radio resource allocation information used in the uplink, temporary ID (e.g., temporary C-RNTI) for terminal identification, and the like.

When the resource allocated through the random access response message based on the radio resource allocation information is large enough to transmit the uplink data to be transmitted by the UE, the UE transmits the uplink data to the BS (or network node) through the allocated resource (S12020).

However, when the allocated resource is not large enough to transmit the uplink data, the UE requests a resource for transmission of the uplink data to transmit the uplink data as illustrated in FIG. 12(*b*).

That is, as illustrated in FIG. 12(*a*), when the resource allocated through the random access response message is not large enough to transmit the uplink data through the random access response message, the UE that performs the random access procedure transmits a resource request message in order to request the resource for transmitting the uplink data to the network node (S12110 and S12120).

The request message may include size information of the uplink data or size information of a resource to be allocated to request the resource for transmission of the uplink data.

The network node allocates the resource to the UE according to the request message and transmits the allocated resource information included in the response message to the UE (S12130).

The UE transmits the uplink data to the network node through the resource allocated by the network node (S12140).

In this manner, even when the UE is not connected with the network node, the UE may be allocated the resource from the network node and transmit the uplink data.

FIG. 13 is a flowchart illustrating one example of a method for receiving downlink data in a state in which UE is not connected with a network node to which the present invention may be applied.

FIGS. 13(*a*) and 13(*b*) illustrate a process in which the UE transmits downlink data by being allocated resources from the BS in a process of performing the random access procedure without establishing the connection with the BS.

In this case, the procedure for transmitting/receiving data in a state where the UE is not connected to the BS (for example, the RRC_Idle state and the ECM_Idle state) may be called a connectionless based data transmission procedure or an RRC connectionless transmission procedure.

Referring to FIG. 13(*a*), when the downlink data transmitted to the UE is generated, the network node transmits a paging message to wake up the UE because the UE is not connected with the network node (S13010).

Thereafter, the UE and the network node perform the random access procedure in the same manner as in step 18010 of FIG. 18 above (S13020) and transmit verification information for verification of the UE to the network node through the resource allocated in the random access procedure (S13030).

The verification information for verifying the terminal may include a UE ID for identifying the UE, a security header type (e.g., not security protected, integrity protected, integrity protected and ciphered, etc.), a key set identifier for identifying a security context, a NAS count, and a message authentication code (MAC).

When verification of the UE is completed, the network node transmits the downlink data to the UE (S13040).

However, when the resource allocated through the random access procedure is not large enough to transmit the verification information for verifying the UE, the UE requests the resource to transmit the data for verifying the UE as illustrated in FIG. 13(b) above.

That is, as illustrated in FIG. 13(b) above, when the resource allocated through the random access response message is not large enough to transmit the verification information for verifying the UE, the UE that performs the random access procedure transmits the resource request message in order to request the resource for transmitting the verification information for verifying the UE to the network node (S13110, S13120, and S13130).

The request message may include size information of the verification information for verifying the UE or size information of a resource to be allocated to request the resource for transmission of the verification information for verifying the UE.

The network node allocates the resource to the UE according to the request message and transmits the allocated resource information included in the response message to the UE (S13140).

The UE transmits the verification information for verifying the UE to the network node through the resource allocated by the network node (S13150).

When the verification of the UE is completed, the network node transmits the downlink data to the UE (S13160).

In this manner, even when the UE is not connected with the network node, the UE may be allocated the resource from the network node and transmit the verification information for verifying the UE and receive the downlink data through the verification of the UE.

However, when the UE transmits and receives data to the network node through a non-connection method as in the methods described with reference to FIGS. 12 and 13, since the required quality varies depending on the service, the resources need to be differentially allocated to the UE according to the requirement of the service.

For example, in the case of delay-sensitive services (e.g., delay sensitive service, low latency service, etc.) and delay-insensitive services (e.g., delay tolerant service), the resources need to be differentially allocated to the UE according to the requirements of the respective services.

As an example of the delay-sensitive service, the following services may exist.

Ultra-high availability and reliability (e.g., 3D connectivity services such as life-friendly eHealth services and public safety service drone) having requirements shown in Table 3 below

TABLE 3

| No. 13 | Ultra-high availability and reliability | |
|---|---|---|
| Main Attributes | Requirement KPI | Notes |
| User Experienced Date Rate (also at the cell edge) | DL: 10 Mbps UL: 10 Mpbs | Data rate enabling real-time video and data transfers (e.g. maps) |
| E2E latency | 10 ms | |
| Mobility | On demand, 0-500 km/h | |

TABLE 3-continued

| No. 13 | Ultra-high availability and reliability | |
|---|---|---|
| Main Attributes | Requirement KPI | Notes |
| Device autonomy | >3 days (standard) Up to several years for some critical MTC services | |
| Connection Density | Not critical | |
| Traffic Density | Potentially high | |

Smart grid system with distributed sensors and management, which requires an immediate response Delay requirement <8 ms and message size of 200 to 1521 bytes Remote control (e.g., cloud robotics, industrial factory automatic)

Delay requirement ≤10 ms and message size of 100 bytes

As an example of the delay-insensitive service, the following services may exist.

Keep alive message service for maintaining application's own connection

Instant message service such as a change of a user state, etc.

Therefore, in order to allocate resources differentially to the idle UEs (for example, the RRC_Idle and the ECM_Idle states) before the connection is established between the BS and the UE according to service requirements, a method for setting the back-off time for the random access differently is proposed.

Figure 14:
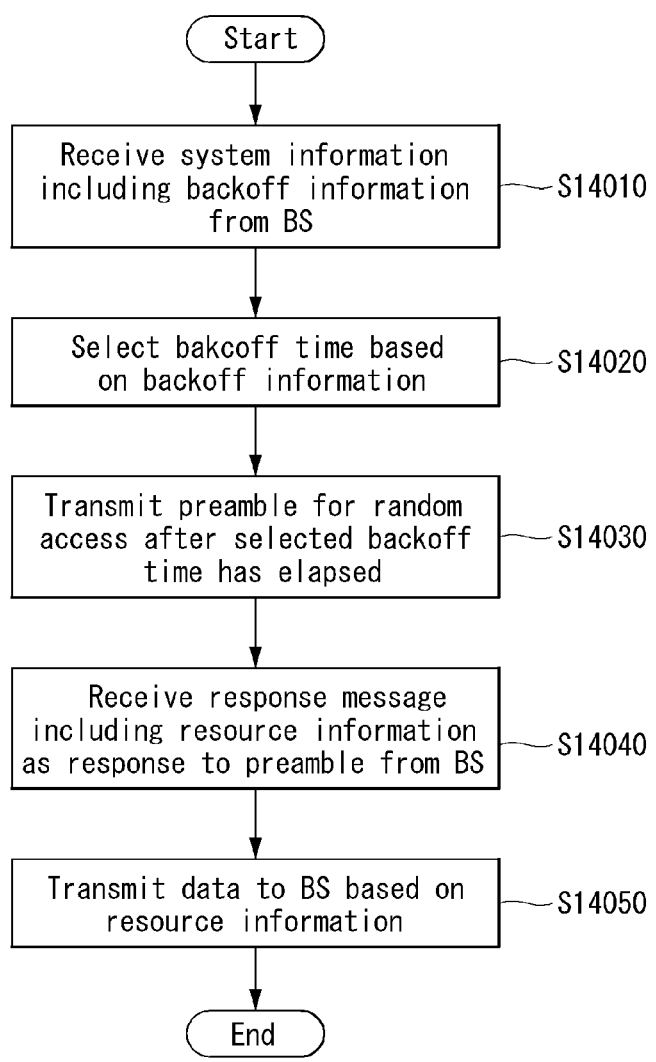
FIG. 14 is a flowchart illustrating one example of an operating method of a UE when transmitting and receiving data by applying a backoff time transmitted from a base station to which the present invention may be applied.

FIG. 14 is a flowchart illustrating one example of an operating method of a UE when transmitting and receiving data by applying a backoff time transmitted from a base station to which the present invention may be applied.

Referring to FIG. 14, in order to transmit data (for example, verification information of the UE for receiving the uplink data or downlink data) in the idle state (for example, RRC_Idle and ECM_Idle states) and the UE transmits data through the resources allocated through the random access procedure.

In this case, the UE may receive information related to the backoff time for the random access from the BS and perform the random access procedure based on the received backoff time.

Specifically, in the related art, the UE performs the random access procedure in order to acquire the uplink data or uplink resources to be used for connection and mobility-related information transmission of the UE.

Therefore, in order to allocate resources to the UE, the BS allocates resources according to the delay requirement of the uplink data in terms of the service. That is, the resources for the uplink data transmitted through the same procedure are allocated from the BS according to the characteristics of the uplink data to be transmitted by the respective UEs.

However, when the random access procedure is performed to transmit the verification information of the UE for receiving the uplink data or the downlink data in a state where no connection is established between the UE and the BS, the BS allocates the resources by considering not only the uplink data but also the downlink data.

That is, since the uplink data and the downlink data are transmitted and received through different procedures as illustrated in FIGS. 12 and 13, the resources need to be allocated considering not only the data characteristics but also a transmission direction of data.

In order to transmit data through resources that are differentially allocated according to the characteristics and transmission direction of the data, the UE may starts the random access procedure based on the backoff time set differently for each UE according to the characteristics of the data and a random access purpose (for example, a direction in which the data is transmitted (uplink or downlink), the size of the data, and the like) from the BS.

To this end, the UE receives a system information block including backoff information including the back-off time set differently according to the characteristics of the data and the random access purpose from the BS (S14010).

The backoff information includes the characteristics (e.g., a request delay time, a data size, etc.) of the data, the number of random access attempts, and the backoff time set differently depending on the random access purpose.

For example, the backoff information may include a minimum value (minimum backoff time, first minimum backoff time) and a maximum value (a maximum backoff time, a first maximum backoff time) of the backoff time according to the characteristics of the data for providing the service, an identifier (ID) indicating whether the minimum backoff time and the maximum backoff time are changed in accordance with the transmission direction, and duration information indicating change values (a first change time α and a second change time β) applied when the minimum backoff time and the maximum backoff time are changed in accordance with the transmission direction, a point of time when the minimum backoff time and the maximum backoff time are applied, and a duration during which the minimum backoff time and the maximum backoff time are applied.

The backoff time information may be set in a table format or a list format.

Table 4 shows one example of the set backoff time information.

TABLE 4

| QoS Class | Service characteristics | Service delay requirement | Backoff parameter set |
|---|---|---|---|
| 0 | Delay sensitive | 5 | A |
| 1 | Delay sensitive | 10 | B |
| 2 | Delay tolerant | 100 | C |
| 3 | Delay Tolerant | 300 | D |

The UE may select a specific backoff parameter set according to the QoS class of the data, the service characteristics, and the service delay requirement and select a random backoff time based on the backoff time included in the selected backoff parameter set.

Specifically, the UE selects the minimum backoff time and the backoff time to be applied according to the characteristics of the data to be transmitted, the random access purpose, and the number of random access attempts in the received backoff information.

When the identifier (ID) indicating whether the minimum backoff time and the maximum backoff time are changed in accordance with the transmission direction included in the backoff information indicates the change of the minimum backoff time and the maximum backoff time, the UE changes the minimum backoff time and the maximum backoff time that are selected based on a first change time and a second change time included in the backoff information.

Then, the UE selects the random backoff time within the maximum backoff time from the selected minimum backoff time (S14020).

The UE performs the random access procedure after the random backoff time has elapsed in order to transmit data by applying the selected random backoff time.

That is, after the selected random backoff time has elapsed, the UE selects one preamble in a preamble set and transmits the selected preamble to the BS (S14030).

The UE receives resource information indicating a resource allocated for transmitting the verification information of the UE for receiving the uplink data or the downlink data and a response message including the preamble transmitted by the UE from the base station in response to the preamble (S14040).

The UE transmits the verification information of the UE for receiving the uplink data or the downlink data to the base station through the allocated resource (S14050).

However, when the resource allocated by the BS is not enough to transmit the uplink data, the UE transmits a resource request message for requesting the resource for the uplink data to the BS through the allocated resource.

In response to the resource request message, the UE receives a response message including resource information indicating the resource allocated for transmission of the uplink data and transmits the uplink data to the BS through the allocated resource.

When the UE transmits the verification information to the BS, the UE may receive the downlink data from the BS.

Through such a method, the UE may acquire information related to a backoff time sets differently according to the characteristics of the data, the number of random access attempts, and whether to attempt the random access for transmission of the uplink data or whether to attempt the random access for receiving the downlink data from the BS and perform the random access procedure for data transmission at a different time from other UEs through the acquired backoff information.

FIG. 15 is a flowchart illustrating one example of an operating method of a base station for differentially setting a backoff time between terminals to which the present invention may be applied.

Referring to FIG. 15, the BS may set the backoff time for the random access to the UEs differentially in accordance with the characteristics of the data for providing the service, the number of random access attempts of the UE, and the random access purpose of the UE.

Specifically, the BS sets the backoff time differently according to the characteristics of the data and the random access purpose for providing the service to the terminal and transmits the system information block including the set backoff information to the UEs (S15010 and S15020).

The backoff information includes the characteristics (e.g., a request delay time, a data size, etc.) of the data, the number of random access attempt times, and the backoff time set differently depending on the random access purpose.

For example, the backoff information may include a minimum value (minimum backoff time) and a maximum value (maximum backoff time) of the backoff time according to the characteristics of the data, the random access purpose, and the random access attempt, an identifier (ID) indicating whether the minimum backoff time and the maximum backoff time are changed in accordance with the random access purpose, and duration information indicating change values (a first change time and a second change time) applied when the minimum backoff time and the maximum backoff time are changed in accordance with the random access purpose, a point of time when the minimum backoff time and the maximum backoff time are applied, and a duration during which the minimum backoff time and the maximum backoff time are applied.

The BS receives the preambles transmitted based on the backoff time selected according to the characteristics of the data to be transmitted by the UEs, the number of random access attempts, and the random access purpose (S15030).

That is, the BS may receive the preambles from the UEs after random backoff points of time selected within the minimum backoff time and the maximum backoff time set according to the characteristics of the data to be transmitted by the UEs, the number of random access attempts, and the random access purpose, respectively have elapsed.

Accordingly, the BS may receive the preamble at different points of time from the UEs.

The BS allocates the resource for transmission of the verification information of the UE for receiving the uplink data or the downlink data to the UEs based on the received preamble (S15040).

The BS generates a response message including the resource information indicating the allocated resource and the received preamble and transmits the generated response message to the UE (S15050).

Thereafter, the BS may receive the uplink data or the verification information through the resource allocated from the UE (S15060).

However, when the allocated resource is not enough to transmit the uplink data, the BS additionally receives a resource request message for requesting the resource for transmission of the uplink data or the verification information from the UE.

In response to the resource request message, the BS transmits a response message including resource information indicating the resource allocated for transmission of the uplink data and receives the uplink data or the verification information from the UE through the allocated resource.

When the BS receives the verification information from the UE, the BS verifies whether the UE is a UE that needs to transmit the downlink data based on the received verification information.

The BS may transmit the downlink data to the UE when the UE transmitting the verification information is the terminal that needs to transmit the downlink data as a result of the verification.

Through such a method, since the BS may receive the preamble for the random access at different times from the UEs according to the characteristics of the data, the number of random access attempts, whether to attempt the random access for transmission of the uplink data or whether to attempt the random access for reception of the downlink data from the UEs, the BS may differentially allocate the resource to the UEs.

FIGS. 16 to 18 are diagrams illustrating one example of backoff information indicating a backoff time of the UE to which the present invention may be applied.

FIGS. 16 to 18 illustrate one example of the backoff information (or backoff parameter set) described in FIGS. 14 and 15.

FIGS. 16(a) and 16(b) illustrate one example in which the backoff time of the random access procedure for transmitting the uplink data increases according to the identifier (ID) indicating whether the minimum backoff time and the maximum backoff time are changed.

As illustrated in FIG. 16, the backoff information includes a backoff parameter value (minimum backoff time and maximum backoff time), and a minimum backoff time and a maximum backoff time depending on a value of the identifier indicating whether the backoff parameter is changed according to the random access purpose.

When the value of the identifier indicates the change of the backoff parameter according to the transmission direction of the data, the backoff time of the random access for transmission of the uplink data increases in accordance with the changed value.

For example, as illustrated in FIGS. 16(a) and 16(b), the minimum backoff time for transmission of the uplink data according to the value of a included in the backoff information increases as compared with the minimum backoff time for reception of the downlink data and the maximum backoff time for transmission of the uplink data according to the value of β increases as compared with the maximum backoff time for reception of the downlink data.

FIG. 17 illustrates one example of backoff information in a case where the backoff time of the random access procedure for transmitting the uplink data increases and the backoff time of the random access procedure for transmitting the downlink data decreases according to the identifier (ID) indicating whether the minimum backoff time and the maximum backoff time are changed.

For example, as illustrated in FIG. 17, when the value of the identifier included in the backoff information indicates the change of the backoff parameter according to the transmission direction of the data, the maximum backoff time for transmitting the uplink data decreases according to the value of a included in the backoff information and the maximum backoff time for receiving the uplink data increases according to the value of β.

FIG. 18 illustrates one example of backoff information in a case where the backoff time of the random access procedure for transmitting the uplink data increases and the backoff time of the random access procedure for transmitting the downlink data decreases according to the identifier (ID) indicating whether the minimum backoff time and the maximum backoff time are changed.

For example, as illustrated in FIG. 18, when the value of the identifier included in the backoff information indicates the change of the backoff parameter according to the transmission direction of the data, the maximum backoff time for transmitting the uplink data decreases according to the value of a included in the backoff information.

Further, the maximum backoff time for transmitting the uplink data decreases according to the value of β.

In this case, since the value of a can be set to be larger than the value of D, the maximum backoff time for transmission of the uplink data may be set to be continuously larger than the maximum backoff time for reception of the own link data.

In another embodiment of the present invention, the backoff information may be configured as shown in Table 5 or 6 below.

TABLE 5

| Number of random access attempts | Backoff parameter value | | Change X of backoff parameter value depending on data transmission direction | | Change O of backoff parameter value depending on data transmission direction | | | |
|---|---|---|---|---|---|---|---|---|
| | Minimum backoff time | Maximum backoff time | Minimum backoff time | Maximum backoff time | Minimum backoff time (downlink) | Maximum backoff time (downlink) | Minimum backoff time (uplink) | Maximum backoff time (uplink) |
| 1 | 10 | 40 | 10 | 40 | 10 | 60 | 10 + α | 40 + β |
| 2 | 20 | 60 | 20 | 60 | 20 | 40 | 20 + α | 60 + β |

TABLE 6

| Number of random access attempts | Backoff parameter | |
|---|---|---|
| | Minimum backoff time | Maximum backoff time |
| 1 | 10 | 40 |
| 2 | 20 | 60 |

Figure 19:
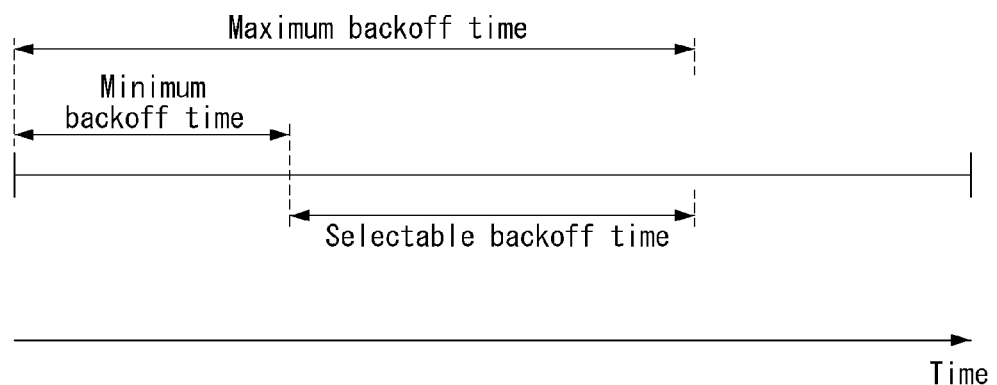
FIG. 19 is a diagram illustrating one example of the backoff time to which the present invention may be applied.

FIG. 19 is a diagram illustrating one example of the backoff time to which the present invention may be applied.

As illustrated in FIG. 19, after receiving the backoff time information described in FIGS. 14 to 18 from the BS, the UE may select a specific minimum backoff time and a specific maximum backoff time according to the characteristics of the data to be transmitted or received by the UE, the number of random access attempts, and the random access purpose.

In this case, a value between the selected minimum backoff time and the selected maximum backoff time is the backoff time that the UE may select.

The UE selects a random backoff time between the selected minimum backoff time and the selected maximum backoff time and performs the random access procedure with the BS after the selected backoff time has elapsed.

Figure 20:
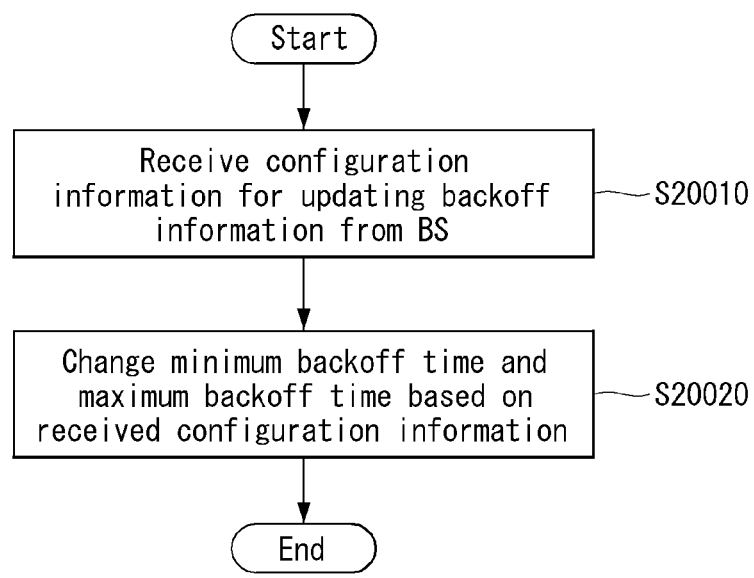
FIG. 20 is a diagram illustrating one example of a method for updating the backoff time to which the present invention may be applied.

FIG. 20 is a diagram illustrating one example of a method for updating the backoff time to which the present invention may be applied.

Referring to FIG. 20, when the UE selects the backoff value through the system information described in FIG. 14 and thereafter, receives backoff information for updating the backoff time from the BS, the UE may change (or update) the backoff time according to the received value.

Specifically, the UE may select the minimum backoff time and the maximum backoff time through the method described with reference to FIGS. 14 to 19 and then receive configuration information for updating the backoff information from the BS (S20010).

The configuration information for updating the backoff information may include backoff information different from the backoff information received in step S14010 of FIG. 14.

For example, the configuration information may include a minimum value (minimum backoff time, second minimum backoff time) and a maximum value (a minimum backoff time, second maximum backoff time) which are changed, an identifier (ID) indicating whether the minimum backoff time and the maximum backoff time are changed in accordance with the transmission direction, and duration information indicating applied change values (a third change time α and a fourth change time β), a point of time when the minimum backoff time and the maximum backoff time are applied, and a duration during which the minimum backoff time and the maximum backoff time are applied.

The configuration information may be transmitted to the UE while being included in the system information block and the response message of the random access procedure.

The UE changes the previously selected information according to the received configuration information and selects the random backoff time according to the changed value (S20020).

Through such a method the BS may transmit the updated backoff information to the UE and the UE may change the previously selected backoff information based on the updated backoff information.

Figure 21:
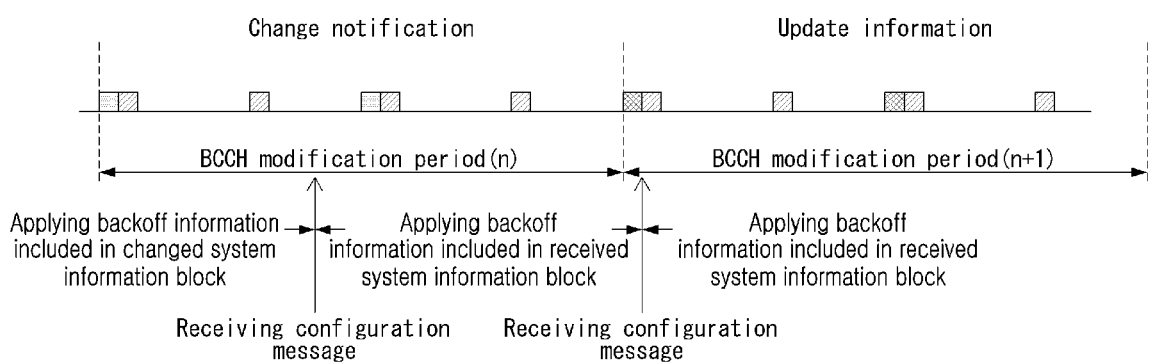
FIG. 21 is a diagram illustrating one example of an update point of time of the backoff time to which the present invention may be applied.

FIG. 21 is a diagram illustrating one example of an update point of time of the backoff time to which the present invention may be applied.

FIG. 21 illustrates one example of a point of time when the UE applies the changed backoff information when receiving the updated backoff information.

As illustrated in FIG. 21, the UE receives the backoff information through the system information and applies the received backoff information to the random access procedure. Thereafter, when receiving the configuration information (or configuration message) including the updated backoff information through the response message of the random access procedure at a specific time, the information included in the updated backoff information may be applied.

Alternatively, when the updated backoff information is transmitted through the changed system information block, the information included in the updated backoff information may be applied after the point of time when the changed system information block is received.

FIG. 22 is a diagram illustrating one example of a message format for transmitting backoff information to which the present invention may be applied.

FIG. 22 illustrates one example of a message (for example, system information block or response message in the random access procedure) including the backoff information or the updated backoff information described in FIGS. 14 to 21.

FIG. 22(*a*) illustrates one example of a message format in which all information included in the backoff information is included in one sub-header.

FIG. 22(*b*) illustrates one example of a message format in which change values (α, β) for changing the backoff parameter is included in sub-header II when all information other than the change values (α, β) for changing the backoff parameter is included in sub-header 1 and an identifier (ID) indicating whether the backoff time and the maximum backoff time included in sub-header 1 are changed indicates the change of the backoff parameter.

Figure 23:
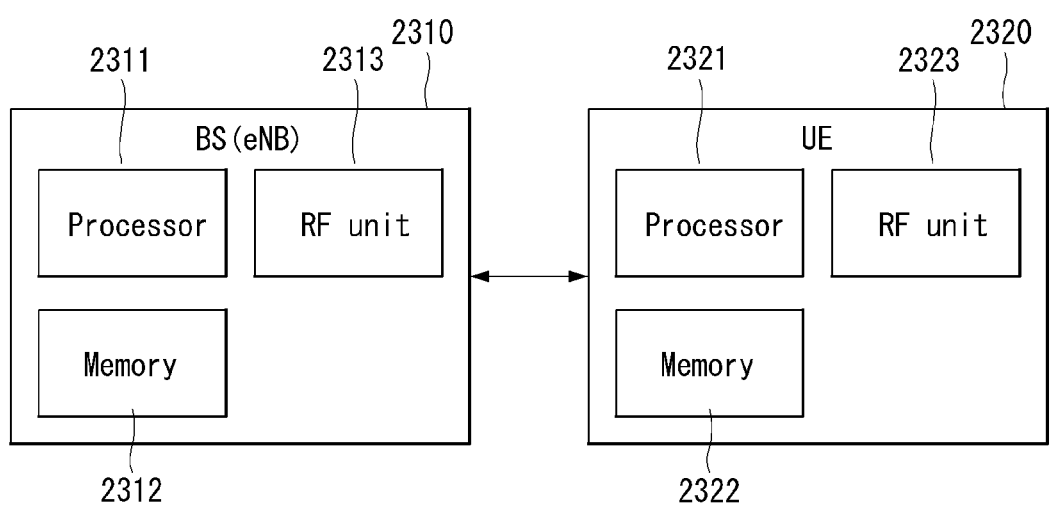
FIG. 23 is a diagram illustrating one example of an internal block diagram of a wireless apparatus to which the present invention may be applied.

FIG. 23 is a diagram illustrating one example of an internal block diagram of a wireless apparatus to which the present invention may be applied.

FIG. 23 is a diagram illustrating one example of an internal block diagram of a wireless apparatus to which the present invention may be applied.

Here, the wireless apparatus may be a base station or a UE and the base station includes both a macro base station and a small base station.

As illustrated in FIG. 23, the base station 2310 and the UE 2320 include communication units (a transceiving unit and an RF unit) 2313 and 2323), processors 2311 and 2321, and memories 2312 and 2322.

Besides, the BS and the UE may further include an input unit and an output unit.

The communication units 2313 and 23 the processors 2311 and 2321, the input unit, the output unit, and the memories 2312 and 2322 are functionally connected to perform the method proposed in this specification.

Upon receiving information generated from a PHY protocol layer, the communication units (the transceiving unit and the RF unit) 2313.2323 and 1523 move the received information to a radio-frequency (RF) spectrum and performs filtering, amplification, and the like and transmits the information to an antenna. Further the communication unit performs a function to move a radio frequency RF) signal received by the antenna to a band that may be processed by a PHY protocol and perform filtering.

In addition, the communication unit may also include a switch function for switching transmission and reception functions.

The processors 2311 and 2321 implement a function, a process, and/or a method which are proposed in this specification. Layers of a radio interface protocol may be implemented by the processor.

The processor may be expressed as a control section, a controller, a control unit, a computer, and the like.

The memories 2312 and 2322 are connected with the processor to store a protocol or a parameter for performing the uplink resource allocation method.

The processors 2311 and 2321 may include an application-specific integrated circuit (ASIC), another chipset, a logic circuit, and/or a data processing apparatus. The memory may include a read-only memory (ROM), a random access memory (RAM), a flash memory, a memory card, a storage medium, and/or other storage devices. The communication unit may include a baseband circuit for processing the radio signal. When the embodiment is implemented by software, the aforementioned technique may be implemented by a module (a process, a function, and the like) that performs the aforementioned function.

The module may be stored in the memory and executed by the processor. The memory may be positioned inside or outside the processor and connected with the processor by various well-known means.

An output unit (display section or display unit) is controlled by the processor, and outputs information output from the processor together with a key input signal generated by a key input unit various information signals from the processor.

Furthermore, although the drawings have been described for the sake of convenience of explanation, it is also possible to design a new embodiment to be implemented by merging the embodiments described in each drawing. It is also within the scope of the present invention to design a computer-readable recording medium in which a program for executing the previously described embodiments is recorded according to the needs of those skilled in the art.

Configurations and methods of the described embodiments may not be limitedly applied to the direction based apparatus search method according to this specification, but all or some of the respective embodiments may be selectively combined and configured so as to be variously modified.

Meanwhile, the direction based apparatus search method of this specification may be implemented as a processor readable code in a processor readable recording medium provided in a network device. The processor readable recording medium includes all kinds of recording devices storing data which may be deciphered by a processor. Examples of the processor readable recording medium include a ROM, a RAM, a CD-ROM, a magnetic tape, a floppy disk, an optical data storage device, and the like and further include a device implemented as a type of a carrier wave such as transmission through the Internet. Further, the processor readable recording media may be stored and executed as codes which may be distributed in the computer system connected through a network and read by the processor in a distribution method.

Further, although the embodiments of this specification have been illustrated and described above, this specification is not limited to the aforementioned specific embodiments, various modifications may be made by a person with ordinary skill in the technical field to which the present invention pertains without departing from the subject matters of the present invention that are claimed in the claims, and these modifications should not be appreciated individually from the technical spirit or prospect of the present invention.

In addition, in this specification, both the invention of the object and the invention of the method are described and the description of both inventions may be supplemented as necessary.

INDUSTRIAL APPLICABILITY

An example in which in the wireless communication system of the present invention, the RRC connection method is applied to the 3GPP LTE/LTE-A system is described primarily, but it is possible to apply the RRC connection method to various wireless communication systems in addition to the 3GPP LTE/LTE-A system.

The invention claimed is:
1. A method for transmitting and receiving data by a user equipment in a wireless communication system, the method comprising:
   receiving a system information blocking comprising backoff information for a random access procedure from a base station, the back off information comprising a first minimum backoff time and a first maximum backoff time;
   selecting a random backoff time between the first minimum backoff time and the first maximum backoff time;
   transmitting a preamble for a random access to the base station after the selected random backoff time has elapsed;
   receiving a response message including resource information for transmitting data in response to the preamble; and
   transmitting the data to the base station based on the resource information.
2. The method of claim 1, wherein the first minimum backoff time and the first maximum backoff time are determined according to at least one of a characteristic of the data, a random access purpose of the user equipment, and the number of times of attempting a random access to the base station.

3. The method of claim 2, wherein the random access purpose indicates whether the user equipment attempts the random access for transmission of uplink data or attempts the random access for reception of downlink data.

4. The method of claim 1, wherein the system information block further includes an identifier (ID) indicating whether to change the first minimum backoff time and the first maximum backoff time according to a transmission direction of the data.

5. The method of claim 4, wherein when the identifier indicates the changes of the first minimum backoff time and the first maximum backoff time, the system information block further comprises a first change time for the change of the first minimum backoff time and a second change time for the change of the first maximum backoff time.

6. The method of claim 5, wherein the first minimum backoff time is changed based on the first change time,
the first maximum backoff time is changed based on the second change time, and
the random backoff time is selected between the changed first minimum backoff time and the changed first maximum backoff time.

7. The method of claim 1, further comprising:
receiving configuration information for updating the first minimum backoff time and the first maximum backoff time,
wherein the configuration information comprises a second minimum backoff time and a second maximum backoff time.

8. The method of claim 7, wherein the first minimum backoff time is changed to the second minimum backoff time, and
the first maximum backoff time is changed to the second maximum backoff time.

9. The method of claim 7, wherein the configuration information is transmitted through updated system information or the response message.

10. The method of claim 1, wherein the system information further comprises at least one of time information indicating a time to which the first minimum backoff time and the first maximum backoff time are applied and duration information indicating a duration to which the first maximum backoff time is applied.

11. The method of claim 1, wherein the first minimum backoff time and the first maximum backoff time are set differently depending on the user equipment.

12. A user equipment for transmitting and receiving data in a wireless communication system, the user equipment comprising:
a transceiver configured to transmit and receive a radio signal; and
a processor functionally coupled with the transceiver,
wherein the processor is configured to:
receive, from a base station, a system information block comprising backoff information for a random access, the backoff information comprising a first minimum backoff time and a first maximum backoff time,
select a random backoff time between the first minimum backoff time and the first maximum backoff time,
transmit, to the base station, a preamble for a random access after the selected random backoff time has elapsed,
receive, from the base station, a response message including resource information for transmitting data in response to the preamble, and
transmit, to the base station, the data based on the resource information.

* * * * *